(12) United States Patent
Berry et al.

(10) Patent No.: US 9,750,272 B2
(45) Date of Patent: Sep. 5, 2017

(54) MEAL INTENDED FOR HUMAN CONSUMPTION

(71) Applicant: Conopco, Inc., Englewood Cliffs, NJ (US)

(72) Inventors: Mark John Berry, Bedfordshire (GB); Heather Frances Jennifer Bligh, Bedfordshire (GB); Mark Ian Fowler, Bedfordshire (GB); Karl John Hunter, Bedfordshire (GB); Katrina Macaulay, Bedfordshire (GB)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 15/179,203

(22) Filed: Jun. 10, 2016

(65) Prior Publication Data

US 2016/0286841 A1 Oct. 6, 2016

Related U.S. Application Data

(63) Continuation of application No. 14/359,487, filed as application No. PCT/EP2012/073846 on Nov. 28, 2012, now Pat. No. 9,386,792.

(30) Foreign Application Priority Data

Nov. 29, 2011 (EP) ..................................... 11191182

(51) Int. Cl.

| A23L 33/00 | (2016.01) |
|---|---|
| A23L 1/29 | (2006.01) |
| A23L 33/105 | (2016.01) |
| A23L 33/17 | (2016.01) |
| A23L 33/21 | (2016.01) |
| A23L 1/30 | (2006.01) |
| A23L 1/305 | (2006.01) |
| A23L 1/308 | (2006.01) |

(52) U.S. Cl.
CPC ............... *A23L 1/296* (2013.01); *A23L 1/293* (2013.01); *A23L 1/3002* (2013.01); *A23L 1/305* (2013.01); *A23L 1/308* (2013.01); *A23L 33/105* (2016.08); *A23L 33/17* (2016.08); *A23L 33/21* (2016.08); *A23L 33/30* (2016.08); *A23L 33/40* (2016.08); *A23V 2002/00* (2013.01)

(58) Field of Classification Search
CPC ........ A23L 33/105; A23L 33/17; A23L 33/21; A23L 33/30; A23L 33/40; A23L 2/00; A23V 2002/00
See application file for complete search history.

(56) References Cited

U.S. PATENT DOCUMENTS

| 9,132,117 | B2* | 9/2015 | Guthrie | A61K 31/353 |
|---|---|---|---|---|
| 2003/0091552 | A1* | 5/2003 | Cartwright | A23L 1/3002 |
| | | | | 424/94.4 |
| 2010/0093678 | A1* | 4/2010 | Della-Fera | A61K 31/12 |
| | | | | 514/167 |
| 2012/0016016 | A1* | 1/2012 | Maher | A61K 31/37 |
| | | | | 514/456 |
| 2013/0095204 | A1* | 4/2013 | Jouni | A23L 1/3002 |
| | | | | 426/2 |
| 2013/0261183 | A1* | 10/2013 | Bhagat | A23L 1/293 |
| | | | | 514/560 |
| 2014/0057843 | A1* | 2/2014 | Berry | A23L 1/29 |
| | | | | 514/6.9 |
| 2014/0349923 | A1* | 11/2014 | Paulik | A61K 31/19 |
| | | | | 514/5.3 |

FOREIGN PATENT DOCUMENTS

NL WO 2011147862 A1 * 12/2011 ............... A23L 1/29

OTHER PUBLICATIONS

Cordain. The nutritional characteristics of a contemporary diet based upon paleolithic food groups. JANA 2002, 5(3):15-24.*
González-Castejón et al. Dietary phytochemicals and their potential effects on obesity: A review. Pharmacological Research 2011 (64):438-455.*
Jew et al. Evolution of the Human Diet: Linking Our Ancestral Diet to Modern Functional Foods as a Means of Chronic Disease Prevention. J Med Food 12 (5) 2009, 925-934.*
Prentice et al. Prentice et al. Obes.Rev. 2003, 4(4):187-94. Obes. Rev. 2003, 4(4):187-94 (Abstract).*

* cited by examiner

*Primary Examiner* — Robert A Wax
*Assistant Examiner* — Olga V Tcherkasskaya
(74) *Attorney, Agent, or Firm* — Greenberg Traurig, LLP

(57) ABSTRACT

This invention relates to a plurality of compositions for dietary health management and its use in the prevention or treatment of cardiovascular disease or type 2 diabetes, and also in the prevention and/or management of obesity and generally in weight management and loss. Thus a meal intended for human consumption is provided, the meal comprising: (a) 250-650 kilocalories (1045-4180 kiloJoules); (b) 10-50, preferably 20-50, more preferably 30-50 g fiber; (c) 10-50, preferably 10-30, more preferably 10-20 g protein; (d) 0 to 5, preferably less than 3 g starch; and (e) 0 to 2, preferably 0 to 1, most preferably 0 to 0.5 g lactose; (f) at least 20, preferably at least 30, most preferably at least 40 mg of any one flavonoid aglycone; and (g) at least 30, preferably at least 40, most preferably at least 50 mg of any one flavonoid glucoside; wherein the meal comprises 75-1000 mg of total flavonoid aglycone and flavonoid glucoside, wherein the meal comprises no more than 250 mg of any one flavonoid aglycone, wherein the meal comprises no more than 250 mg of any one flavonoid glucoside.

7 Claims, 7 Drawing Sheets

MEAL INTENDED FOR HUMAN CONSUMPTION

RELATED APPLICATIONS

This application is a continuation of U.S. patent application Ser. No. 14/359,487, filed May 20, 2014, which is a national phase filing under 35 USC 371 of International Application No. PCT/EP2012/073846, filed on Nov. 28, 2012, which claims the benefit of European Patent Application No. 11191182.2, filed on Nov. 29, 2011, the entirety of which are hereby incorporated herein by reference for all purposes.

This invention relates to a plurality of compositions for dietary health management and its use in the prevention or treatment of cardiovascular disease, type 2 diabetes and obesity; and in weight management and weight loss.

Human evolution has been a very slow process in contrast to the relatively recent, rapid changes in our diet since the Neolithic revolution which marked the switch from hunter-gatherer to agricultural life-style around 10,000 years ago. Moreover our genome has not had time to evolve at the same pace and therefore it is postulated that our bodies will work more efficiently with an ancestral Stone Age (Palaeolithic) diet Cordain (J. Am. Nutraceutical Ass., 5, 3, 15-24 (Summer 2002)).

Cordain (J. Am. Nutraceutical Ass., 5, 3, 15-24 (Summer 2002)) discloses a contemporary dinner based upon Paleolithic food groups, reproduced below in Table 1. Table 2 summarises its nutritional analysis using the US Department of Agriculture National Nutrient Database for Standard Reference and Phenol-Explorer database.

Cordain explains that a difference between the typical Western diet and the aforementioned diet based on Paleolithic food groups is that the latter has a much higher level of protein. As protein has three times the thermic effect and a greater satiety value of either fat or carbohydrate, a protein rich diet may be effective for weight control or loss. Cordain then references clinical studies which have shown that calorie-restricted protein rich diets are more effective than calorie-restricted carbohydrate rich diets at reducing weight in overweight subjects.

Törrönen et al (British J. Nutrition, 1-7 (2011)) disclose that dietary polyphenols may influence sucrose metabolism. Törrönen et al also explain that many polyphenols have inhibited alpha glucosidase activity or glucose transport in-vitro, and suppressed elevated blood glucose levels after oral administration of glucose or sucrose in animals. In their study, peak capillary and venous plasma glucose levels were lower after ingestion of a mixed berry meal (blackcurrants, bilberries, cranberries and strawberries) on a natural sugar meal. Jew et al (J. Medicinal Food, 12 (5), 925-934 (2009)) discloses that shifts have occurred from diets high in fruits, vegetables, lean meats, and seafood to processed foods high in sodium and hydrogenated fats and low in fibre. These dietary changes have adversely affected dietary parameters known to be related to health, resulting in an increase in obesity and chronic disease, including cardiovascular disease, diabetes, and cancer. Jew et al further discloses in Table 3 a sample menu for a modern diet based on Paleolithic food groups. Nutritional analysis of the breakfast, lunch and dinner disclosed in Table 3 using the US Department of Agriculture National Nutrient Database for Standard Reference and Phenol-Explorer database provides the information summarised in Table 2 below.

TABLE 1

Breakfast, lunch and dinner disclosed in Table 3 of Jew et al (J. Medicinal Food, 12 (5), 925-934 (2009)) and partly in Cordain (J. Am. Nutraceutical Ass., 5, 3, 15-24 (Summer 2002)).

| Ingredients | Weight (gram) |
|---|---|
| Breakfast | |
| Cantaloupe | 276 |
| Atlantic salmon (broiled) | 333 |
| Lunch (vegetable salad with walnuts) | |
| Shredded Romaine lettuce | 68 |
| Sliced carrot | 61 |
| Sliced cucumber | 78 |
| Quartered tomatoes | 246 |
| Lemon juice dressing | 31 |
| Walnuts | 11 |
| Broiled lean pork loin | 86 |
| Dinner (vegetable avocado/almond salad) | |
| Shredded mixed greens | 112 |
| Tomato | 123 |
| Avocado | 85 |
| Slivered almonds | 45 |
| Sliced red onion | 29 |
| Lemon juice dressing | 31 |
| Steamed broccoli | 468 |
| Lean beef sirloin tip roast | 235 |
| Dessert (strawberries) | 130 |

TABLE 2

Nutritional values for breakfast, lunch and dinner disclosed in Table 3 of Jew et al (J. Medicinal Food, 12 (5), 925-934 (2009)) and partly in Cordain (J. Am. Nutraceutical Ass., 5, 3, 15-24 (Summer 2002)) as disclosed and normalised to 650 Kcal. Values calculated using the US Department of Agriculture National Nutrient Database for Standard Reference and Phenol-Explorer database.

| | Nutritional values | | | | | |
|---|---|---|---|---|---|---|
| | Breakfast | | Lunch | | Dinner | |
| Nutritional indicator | | Normalised to 650 kcal | | Normalised to 650 kcal | | Normalised to 650 kcal |
| Calories (kcal) | 780 | 650 | 272 | 650 | 1332 | 650 |
| Fibre (g) | 2.5 | 2.1 | 7.3 | 17.4 | 38.0 | 21.8 |
| Protein (g) | 75.9 | 63.3 | 23.9 | 57.1 | 91.0 | 52.3 |
| Starch (g) | 0.1 | 0.1 | 1.5 | 3.6 | 0.7 | 0.4 |
| Lactose (g) | 0.0 | 0.0 | 0.0 | 0.0 | 0.0 | 0.0 |

TABLE 2-continued

Nutritional values for breakfast, lunch and dinner disclosed in Table 3 of
Jew et al (J. Medicinal Food, 12 (5), 925-934 (2009)) and partly in Cordain
(J. Am. Nutraceutical Ass., 5, 3, 15-24 (Summer 2002)) as disclosed and
normalised to 650 Kcal. Values calculated using the US Department of
Agriculture National Nutrient Database for Standard Reference and Phenol-
Explorer database.

| Nutritional indicator | Breakfast | Normalised to 650 kcal | Lunch | Normalised to 650 kcal | Dinner | Normalised to 650 kcal |
|---|---|---|---|---|---|---|
| Flavonoid aglycone (mg) | 0.00 | 0.00 | 0.03 | 0.07 | 24.3 | 14.0 |
| Flavonoid glucoside (mg) | 0.00 | 0.00 | 0.59 | 1.41 | 82.0 | 47.1 |
| Anthocyanidin (mg) | 0.00 | 0.00 | 0.00 | 0.00 | 6.22 | 3.57 |
| Cyanidin (mg) | 0.00 | 0.00 | 0.00 | 0.00 | 0.65 | 0.37 |
| Delphindin (mg) | 0.00 | 0.00 | 0.00 | 0.00 | 0.00 | 0.00 |
| Epicatechin (mg) | 0.00 | 0.00 | 0.00 | 0.00 | 0.603 | 0.346 |
| Kaempferol (mg) | 0.00 | 0.00 | 0.02 | 0.05 | 0.014 | 0.008 |
| Pelargonidin (mg) | 0.00 | 0.00 | 0.00 | 0.00 | 5.57 | 3.20 |
| Quercetin (mg) | 0.00 | 0.00 | 0.01 | 0.02 | 0.0139 | 0.007981 |
| Cyanidin-3-glucoside (mg) | 0.00 | 0.00 | 0.00 | 0.00 | 3.76 | 2.16 |
| Pelargonidin-3-glucoside (mg) | 0.00 | 0.00 | 0.00 | 0.00 | 60.9 | 35.0 |
| Quercetin-3,4-diglucoside (mg) | 0.00 | 0.00 | 0.00 | 0.00 | 0.897 | 0.515 |
| Quercetin-3-glucoside (mg) | 0.00 | 0.00 | 0.25 | 0.60 | 8.42 | 4.83 |
| Quercetin-4-glucoside (mg) | 0.00 | 0.00 | 0.00 | 0.00 | 0.665 | 0.382 |
| Carbohydrate (g) | 24.3 | 20.3 | 25.6 | 61.2 | 113.0 | 64.9 |
| Energy density (kcal/g) | 1.28 | 1.28 | 0.47 | 0.47 | 1.06 | 1.06 |

Standardised to 650 Kcal per meal, the meals are relatively low in fibre and flavonoids, and high in protein compared to the meal of the invention. Levels of carbohydrates are generally comparable. From the data available in the Phenol Explorer database, flavonoid aglycones, glucosides and anthocyanidins seem to be largely absent in the breakfast, low in the lunch, but moderately high in the dinner.

Frassetto et al (Eur. J. Clinical Nut., 63, 947-955 (2009)) discloses a study investigating whether a diet similar to that consumed by Man's pre-agricultural hunter-gatherer ancestors confers health benefits. The results showed improved arterial blood pressure and glucose tolerance, decrease in insulin secretion and increased insulin sensitivity, and improved lipid profile without weight loss in healthy sedentary humans. Table 2 describes the meals given to the test cohort on a daily basis, but in insufficient detail to be reproduced.

Jonsson et al (Cardiovascular Diabetology, 8:35 (2009)) discloses a study of the effects on cardiovascular disease risk factors of a Paleolithic and diabetes diet in patients with type 2 diabetes not treated with insulin. The results showed that the Paleolithic diet improved glyceamic control and several cardiovascular disease risk factors compared to a diabetes diet in patients with type 2 diabetes. Table 5 describes the average amount of food eaten per day by the test cohort but in insufficient detail to reproduce individual meals.

Jonsson et al (Nutrition and Metabolism, 7:85 (2010)) reports the results of a study on patients with ischaemic heart disease of the effects of a Paleolithic diet compared to a Mediterranean diet on satiety. It was observed that the Paleolithic diet is more satiating per calorie than a Mediterranean diet. Table 2 describes the food given to the test cohort on a daily basis, but in insufficient detail to reproduce individual meals.

Lindeberg et al (Diabetologica, 50:1795-1807 (2007)) describes a comparative study of a Paleolithic diet and a Mediterranean diet on patients with ischaemic heart disease plus either glucose intolerance or type 2 diabetes. It was concluded that a Paleolithic diet may improve glucose tolerance independently of decreased waist circumference. Table 5 describes the average daily diet composition but in insufficient detail for individual meals to be reproduced.

Jew et al has disclosed that Palaeolithic diets were rich in plants. However, the present inventors have also theorised that in Palaeolithic times plants themselves would have been different nutritionally. Specifically they would have contained more flavonoids and fibres than modern day crops. This is because the content of flavonoids and fibres in many modern day crops have been reduced by breeding programmes aimed to change flavour and texture (some flavonoids taste bitter; some fibres are "stringy"). Therefore, the present inventors have selected modern plants that are known to be relatively high in both flavonoids and fibre for the meals disclosed in this patent. The resulting nutritional content of the meals thus designed will therefore be closer to the Paleolithic nutrition that the human has evolved to consume and therefore be more compatible with human physiology and therefore will deliver health benefits as illustrated in the examples. There are continuing efforts to provide meals with improved health and ancillary benefits.

SUMMARY OF THE INVENTION

In a first aspect of the invention, a meal intended for human consumption is provided, the meal comprising:
(a) 250-650 kilocalories (1045-4180 kiloJoules);
(b) 10-50, preferably 20-50, more preferably 30-50 g fibre;
(c) 10-50, preferably 10-30, more preferably 10-20 g protein;
(d) 0 to 5, preferably less than 3 g starch; and
(e) 0 to 2, preferably 0 to 1, most preferably 0 to 0.5 g lactose;
(f) at least 20, preferably at least 30, most preferably at least 40 mg of any one flavonoid aglycone; and
(g) at least 30, preferably at least 40, most preferably at least 50 mg of any one flavonoid glucoside;
wherein the meal comprises 75-1000 mg of total flavonoid aglycone and flavonoid glucoside,
wherein the meal comprises no more than 250 mg of any one flavonoid aglycone,
wherein the meal comprises no more than 250 mg of any one flavonoid glucoside.

The term "meal" means a complete (all courses including dessert) breakfast, lunch or dinner, excluding beverages.

In a second aspect of the invention, a meal intended for human consumption is provided, the meal comprising, when the meal has an energy content of 650 kilocalories:
(a) 10-50, preferably 20-50, more preferably 30-50 g fibre;
(b) 10-50, preferably 10-30, more preferably 10-20 g protein;
(c) 0 to 5, preferably less than 3 g starch;
(d) 0 to 2, preferably 0 to 1, most preferably 0 to 0.5 g lactose;
(e) At least 450, preferably at least 500, most preferably at least 700 mg flavonoid aglycone and/or flavonoid glucoside when expressed in gallic acid equivalents (GAE); and
(f) Optionally no more than 2000, preferably 1500 mg flavonoid aglycone and/or flavonoid glucoside when expressed in gallic acid equivalents (GAE).

In a third aspect of the invention, a method for the prevention or treatment of cardiovascular disease, type 2 diabetes and obesity; and for weight management and weight loss is provided, the method comprising the step of administering to a person in need therefor the meal of the first aspect of the invention.

BRIEF DESCRIPTION OF THE FIGURES

The invention is exemplified with reference to the following figures which show in.

DETAILED DESCRIPTION OF THE INVENTION

Figure 1:
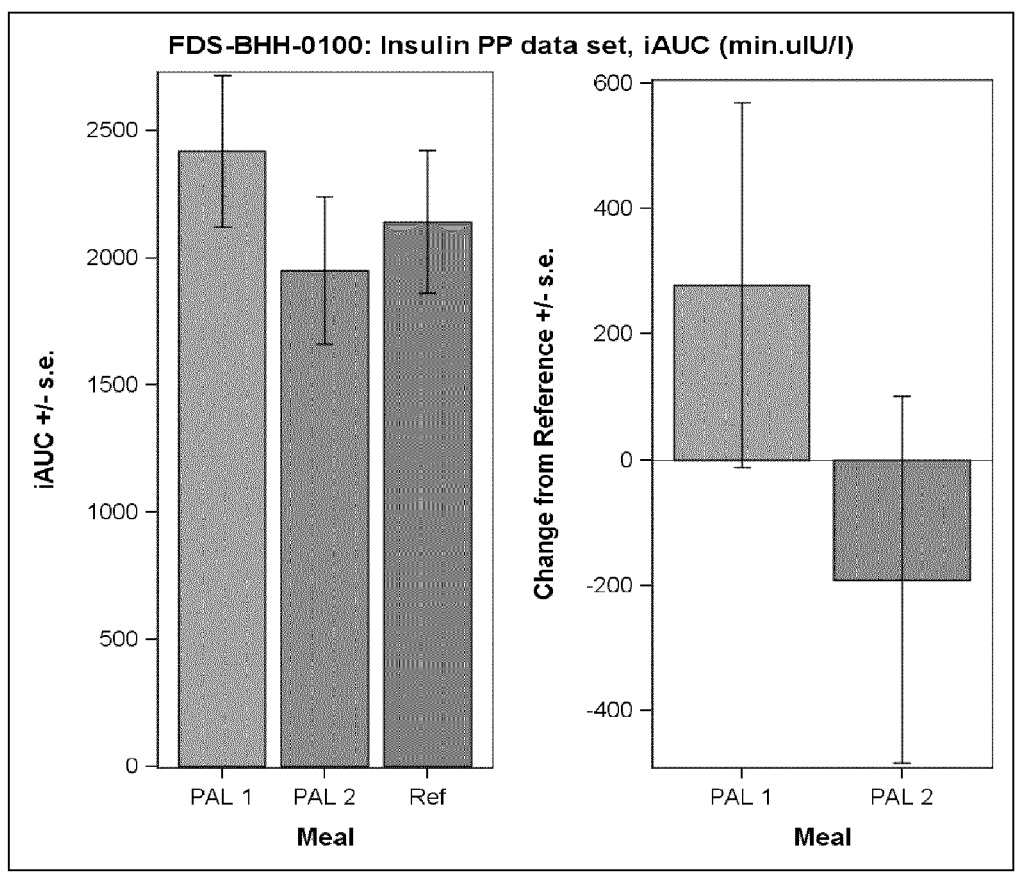
FIG. 1 venous plasma insulin results as net incremental area under the concentration versus time curve for 0-2 hours (min·uIU/L). Bar graphs in the figure on the left depict mean values+/−standard error of the mean, the bars on the right show the changes compared to the Reference meal (min·uIU/L) and +/−standard error of the mean. Data is based on 18, 20 and 20 insulin curves as obtained from PAL1, PAL2 and Reference meal respectively.

In a first aspect of the invention, a meal intended for human consumption is provided, the meal comprising:
(a) 250-650 kilocalories (1045-4180 kiloJoules);
(b) 10-50, preferably 20-50, more preferably 30-50 g fibre;
(c) 10-50, preferably 10-30, more preferably 10-20 g protein;
(d) 0 to 5, preferably less than 3 g starch; and (e) 0 to 2, preferably 0 to 1, most preferably 0 to 0.5 g lactose;
(f) at least 20, preferably at least 30, most preferably at least 40 mg of any one flavonoid aglycone; and
(g) at least 30, preferably at least 40, most preferably at least 50 mg of any one flavonoid glucoside;
wherein the meal comprises 75-1000 mg of total flavonoid aglycone and flavonoid glucoside,
wherein the meal comprises no more than 250 mg of any one flavonoid aglycone,
wherein the meal comprises no more than 250 mg of any one flavonoid glucoside, is proposed. The upper limit of fibre is limited by the risk of intestinal upset beyond the claimed level. The upper limit of total flavonoid aglycone and flavonoid glucoside is limited by the need to mask the increasing bitterness associated with the flavonoid aglycone and flavonoid glucoside.

In a second aspect of the invention, a meal intended for human consumption is provided, the meal comprising, when the meal is normalised to an energy content of 650 kilocalories:
(a) 10-50, preferably 20-50, more preferably 30-50 g fibre;
(b) 10-50, preferably 10-30, more preferably 10-20 g protein;
(c) 0 to 5, preferably less than 3 g starch;
(d) 0 to 2, preferably 0 to 1, most preferably 0 to 0.5 g lactose;
(e) At least 450, preferably at least 500, most preferably at least 700 mg flavonoid aglycone and/or flavonoid glucoside when expressed in gallic acid equivalents (GAE); and
(f) Optionally no more than 2000, preferably 1500 mg flavonoid aglycone and/or flavonoid glucoside when expressed in gallic acid equivalents (GAE)

Thus in the second aspect of the invention, the invention is expressed in terms of a meal with nutrient levels only when the meal is normalised to an energy content of 650 kilocalories. Therefore the ambit of the claim includes meals with energy contents of greater than or less than 650 kilocalories but when normalised to 650 kilocalories have nutrient levels as set forth in functional features (a) to (f).

It has been observed that satiety levels are much improved with the claimed meal over a Reference meal based on World Health Organisation (WHO) dietary guidelines (WHO technical report series no. 916 "Diet, nutrition and the prevention of chronic diseases" (2003)). What is surprising is that this is achieved even at levels of protein found in the Reference meal, i.e., at much lower levels than found in a meal based on Paleolithic diet principles, for example the meal described in Cordain and in Jew et al earlier. Protein is typically provided by meat. Livestock requires significant resource and therefore one advantage of a meal with lower protein levels is that it is more sustainable environmentally. Protein can also be provided by soya, but this cannot be grown in all regions of the world. Another unexpected observation was that the high levels of flavonoids (aglycone and glucosides) in the claimed meal resulted in a lowering in peak insulin levels in the absence of a lowering in peak glucose levels for a given level of total carbohydrate. Post-prandial insulin peaks are associated with increased risk of type 2 diabetes and cardiovascular disease. Thus it seems that the claimed diet affords a means to a meal which leads to a lower post-prandial insulin peak with a caloric intake more balanced between protein and carbohydrates rather than a meal with elevated protein levels previously observed with meals based on Paleolithic diet principles e.g., Cordain.

Preferably a petroleum ether (40-60° C.) extract of an aqueous methanol extract of the meal of the second aspect of the invention has a gallic acid equivalent of 5-40, preferably 15-30, more preferably 20-30 mg,
wherein a dichloromethane extract of the aqueous methanol extract after petroleum ether (40-60° C.) extraction of the aqueous methanol extract has a gallic acid equivalent of 5-25, preferably 10-20, more preferably 13-18 mg,
wherein an ethyl acetate extract of the aqueous methanol extract after sequential petroleum ether (40-60° C.) and dichloromethane extraction has a gallic acid equivalent of 20-40, preferably 25-35 mg,
wherein a 1-butanol extract of the aqueous methanol extract after sequential petroleum ether (40-60° C.), dichloromethane and ethyl acetate extraction has a gallic acid equivalent of 100-400, preferably 150-350, most preferably 200-300 mg, and
wherein a water extract of the aqueous methanol extract after sequential petroleum ether (40-60° C.), dichloromethane, ethyl acetate and 1-butanol extraction has a gallic acid equivalent of 400-1200, preferably 600-1000, most preferably 700-900 mg.

Preferably the flavonoid aglycone of either the first or second aspects of the invention comprises at least 0.05, preferably at least 0.25, more preferably at least 0.5 mg of at least one anthocyanidin. In particular the meal may comprise any one of the group consisting of apigenin, luteolin, myricetin, quercetin, cyanidin-3-glucoside, malvidin-3-glucoside, pelargonidin-3-glucoside and mixtures thereof.

An energy density of 0.25-1 kilocalories (4.18 kiloJoules)/g meal has been observed to be particularly advantageous for addressing satiety and hence of value in the prevention or treatment of obesity, in weight management and weight loss.

In another aspect of the invention, the claimed meal may be for use as a medicament, specifically for use in the prevention or treatment of cardiovascular disease, type 2 diabetes and obesity; and in weight management and weight loss.

Alternatively another aspect of the invention is the use of the claimed meal for the manufacture of a medicament for the prevention or treatment of cardiovascular disease, type 2 diabetes and obesity; and for weight management and weight loss.

A further aspect of the invention is a method for the prevention or treatment of cardiovascular disease, type 2 diabetes and obesity; and for weight management and weight loss, the method comprising the step of administering to a person in need therefor the claimed meal.

Yet a further aspect of the invention is use of the claimed meal for prevention or treatment of obesity; and for weight management and weight loss.

A study is described hereinbelow showing the postprandial and health benefits of Palaeolithic-type meals (PAL1 and PAL2) as compared to a meal constructed along the lines of the WHO dietary recommendations (Reference meal). The three test meals were normalized to contain 50 gram of available carbohydrates. Two of the meals were Palaeolithic-type meals and the third was a meal based in WHO guidelines. All the meals were consumed as a breakfast.

The Reference meal was based on WHO dietary guidelines for protein, fat and carbohydrate and comprises everyday "modern" ingredients such as white rice. The modern, more processed diet has excluded many of the phytochemicals believed to maintain health and stimulate vitality. There is a propensity for processed foods to consist of fabricated structures made from refined ingredients (particularly starches) and to be high in simple sugars without the associated fibre and phytochemicals. Palaeolithic meal 1 (PAL 1) was based on estimated ratios for protein, fat and carbohydrates that are typical of Hunter-Gatherers and not made with ingredients that would not have been available in Palaeolithic times (e.g. no cereals, no dairy). This meal included large quantities of fruit and vegetables, a high proportion of protein and fat, but very low levels of starches. Palaeolithic meal 2 (PAL 2) was based on WHO dietary guidelines for protein, fat and carbohydrate but also not made with ingredients that would not have been available in Palaeolithic times (e.g. PAL 2 did not include cereals or dairy products). PAL 2 also included similar levels of fruit and vegetables to PAL 1.

EXAMPLE 1

1.1 Preparation of Meals

The three meals summarised in Table 3 were prepared as described hereinbelow.

TABLE 3

Description of Meals.

|  | Unit | Reference | PAL 1 | PAL 2 |
|---|---|---|---|---|
| Rice, white, long-grain, regular, cooked, | g | 90 | — | — |
| Strawberries, raw | g | — | 100 | 120 |
| Apples, raw, with skin | g | — | 110 | 110 |
| Peppers, sweet, yellow, raw | g | — | 100 | 100 |
| Fish, haddock, cooked, dry heat | g | — | 90 | — |
| Onions, sweet, raw | g | — | 60 | 60 |
| Mango, frozen | g | 65 | — | — |
| Carrots, cooked, boiled, drained, without salt | g | 50 | — | — |
| Eggplant, raw | g | — | 50 | 50 |
| Mushrooms, white, raw | g | — | 50 | 50 |
| Fish, salmon, Atlantic, farmed, cooked, dry heat | g | 39 | 39 | 39 |
| Raisins, seedless | g | — | 25 | 25 |
| Nuts, almonds, blanched | g | — | 14 | — |
| Oil, olive, salad or cooking | g | 4 | — | — |
| Courgettes | g | — | 150 | 150 |
| Cinnamon | g | — | 5 | 5 |
| Capers | g | — | 5 | 5 |
| Flax seed oil | g | — | 4 | 4 |
| Total weight of listed ingredients | g | 248 | 802 | 732 |

1.1.1 Preparation of Fish

Whole sides of salmon were baked wrapped in foil at 200 degrees Centigrade for 40 minutes until cooked through. This will be defined as when the flesh was easily flaked and no longer translucent. The pink flesh was then removed from the skin and flaked before dividing into 39 gram portions (R2) in clean packaging (some already containing carrots (R3)) and cooled on the bench. The individual portions were then blast frozen at −28 degrees Centigrade for at least 2 hours until frozen solid and then stored at −20 degrees Centigrade until the day of the study.

Pieces of haddock were wrapped in foil and baked at 200 degrees Centigrade for 30 minutes until cooked through. The fish was then removed from any skin and divided into 90 gram portions in clean packaging and added to boxes already containing salmon (R1) and cooled on the bench. The individual portions were then blast frozen at −28 degrees Centigrade for at least 2 hours until frozen solid and stored at −20 degrees Centigrade until the day of the study.

1.1.2 Preparation of Reference Meal

Carrots were peeled and chopped into 1 cm slices and boiled in water for 10 minutes until cooked. The cooked carrots were then cooled and weighed out as individual portions into clean packaging as above along with the salmon for the R3 samples. 4 gram olive oil were also added to these packages which were then frozen in a blast freezer at −28 degrees Centigrade for at least 2 hours until frozen solid and stored at −20 degrees Centigrade until the day of the study. Mango was bought frozen and portions thawed as required from the night before the study at 4 degrees Centigrade and served cold.

The night before the study, the required amount of mango, salmon and carrots (R3) were thawed overnight in a fridge at no more than 4 degrees Centigrade. On the morning of the study the thawed portion of salmon and carrots were microwaved in an 800 W microwave for 3 minutes (75 degrees Centigrade in centre as measured by temperature probe) in the same packaging. On the day of the study rice was cooked using 350 ml water to 265 gram (2 cups) of dry rice. Rice was served while still hot and within 30 minutes of cooking. The cold mango was placed on the plate and 90 gram of freshly cooked rice added.

1.1.3 Preparation of Paleolithic (PAL) Meals

Onions were peeled, peppers had their cores removed, aubergines and courgettes had their ends removed, and apples were cored, but not peeled. Strawberries had their green leaves removed. The capers were washed with water to remove the storing liquor. All the vegetables/fruits/almonds were chopped into large chunks of at least 1 cm along one length. Once chopped, the amounts for each portion were weighed out so that all individual meals could be cooked separately. Oil, cinnamon and capers for one portion will be added to a pan and the remaining chopped, weighed vegetables/fruits/almonds added. All ingredients were cooked on a high heat for 15-20 minutes until cooked thoroughly. Each individual portion was then placed in a clean unused microwaveable packaging, covered and cooled at room temperature for no more than 90 minutes. Individual packages were then placed in a blast freezer at −28 degrees Centigrade within 90 minutes and left overnight. The packages were stored at −20 degrees Centigrade until the day of the study.

The night before the study, the required stir-fry vegetable mixes (P1 and P2) and fish portions (R1 and R2) were taken from the freezer and left in a fridge at no more than 4 degrees Centigrade overnight. On the day of the study one portion of the vegetable mix (P1 and P2) and one portion of each fish required (R2 or R1) were removed from the fridge and the appropriate fish portion mixed into the vegetable mix. The mixture was then microwaved for 3 minutes on full in an 800 W microwave, stirred and then microwaved for a further 3 minutes on full. The core temperature was ascertained as 75 degrees Centigrade in the centre using a temperature probe.

1.2 Chemical Analysis of Meals

The meal for each full day was frozen in liquid nitrogen, freeze-dried, ground in a homogenizer and stored at −70 degrees centigrade under nitrogen. Assays for meals are described below.

1.2.1 Individual Flavanoids Assay

The determination of apigenin, cyanidin-3-glucoside, delphinidin-3-glucoside, hesperetin, kaempferol, luteolin, malvidin-3-glucoside, myricetin, naringenin, pelagonidin-3- glucoside and quercetin was carried out by removing lipids from freeze-dried, ground foodstuffs by the method of Meyer, M. D. et al., (J. Agric. Food Chem., 56, 7439-7445 (2008)) and assaying the extracted flavanoids by HPLC as detailed in Downes, K. et al., (Postharvest Biol. Technol., 54, 80-86 (2009)) for flavonoids and as detailed in Giné Bordonaba, J et al., (J. Agric. Food Chem., 56, 7422-7430 (2008)) for anthocyandins. Components were detected by diode array with reference to known standards and expressed in units of $mg \cdot meal^{-1}$.

The determination of delphinidin, epicatechin, luteolin-7-O-glucoside, phloretin, phloridzin and quercetin-3-O-glucoside were carried out following ethanolic extraction of the freeze-dried foodstuffs. Briefly, 20 g of the freeze-dried foodstuffs was extracted in 200 ml of 70% aqueous ethanol containing 5 g/L ascorbic acid for 2 hours at room temperature with stirring. The suspension was filtered, the filter washed with a further 50 ml of aqueous ethanol containing ascorbic acid, the filtrates combined and the ethanol removed by rotary evaporation at 40 degrees Centigrade. The solution was made up to 100 ml with water and the pH adjusted to 7.0. The solution was passed through a 50 ml Amberchrom CG300C column, washed with 500 ml of water (pH 7.0) and the flavonoids eluted with 750 ml of absolute ethanol. The eluate was dried by rotary evaporation to remove the ethanol and the residual water was removed by freeze-drying. The extracts were analysed using liquid chromatography-mass spectrometry (LC-MS) with negative ion electro-spray MS detection and quantitation using known standards. Values were and expressed in units of $mg \cdot meal^{-1}$.

1.2.2 Sugars Assay

Sugars were extracted with water, clarified and chromatographically separated on an amine column with an acetonitrile/water mobile phase. The sugars were detected using an evaporative light scattering detector and quantified with reference to calibration standards. Values were expressed as $g \cdot meal^{-1}$.

1.2.3 Starch Assay

The method consisted of two separate determinations. The sample was treated with warm diluted hydrochloric acid, clarified and filtered; the optical rotation of the resulting solution was determined. In the second determination, the sample was extracted with 40% aqueous ethanol and filtered. The filtrate was acidified with hydrochloric acid, clarified and filtered again; the optical rotation of the resulting solution was determined at 20±2 degrees centigrade. Values were expressed as $g \cdot meal^{-1}$.

1.2.4 Protein

Protein was determined using the Kjeldahl procedure. Briefly, the sample was digested with a mixture of concentrated sulphuric acid and potassium sulphate using copper (II) sulphate as a catalyst, converting organic nitrogen present to ammonium sulphate. Excess sodium hydroxide was automatically added to the cooled digest to liberate ammonia from the ammonium sulphate. The ammonia was auto-distilled into an excess of auto-dispensed indicator boric acid solution, then auto-titrated with standard sulphuric acid solution. The nitrogen content of the sample was calculated from the amount of ammonia produced. The protein content was determined using a conversion factor of 6.25. Values were expressed as $g \cdot meal^{-1}$.

1.2.5 Total Fat and Fatty Acids

Samples were acid hydrolysed with hydrochloric acid, cooled, filtered and dried. The fat was extracted from the residue with petroleum ether and the dried fat determined gravimetrically. Values were expressed as $g \cdot meal^{-1}$.

Lipid fractions of the sample were solvent extracted. The isolated fat was trans-esterified with methanolic sodium methoxide to form fatty acid methyl esters (FAMES). The FAME profile was determined using capillary gas chromatography (GC). Quantification and identification of individual FAMEs in the test material was achieved with reference to calibration standards. Values were expressed as $g \cdot meal^{-1}$.

1.2.6 Fibre Assay

Fibre was determined using the AOAC procedure. Briefly, the sample was weighed and de-fatted. It was then gelatinised and treated with α-amylase and further digested enzymatically with protease and amyloglucosidase to remove the starch and protein. The suspension was filtered to remove insoluble fibre, which was washed, dried and weighed. Insoluble fibre was then determined gravimetrically and corrected for protein and ash. The soluble fibre remaining in the filtrate was then precipitated with ethanol, filtered, washed, dried and weighed. Soluble fibre was then determined gravimetrically and corrected for protein and ash. Total dietary fibre was determined by precipitating soluble fibre before the removal of insoluble fibre, with the resultant precipitate washed, dried and weighed. Total dietary fibre was then determined gravimetrically and corrected for protein and ash. Values are expressed in units of $g \cdot meal^{-1}$.

1.2.7 Sodium

Sodium was assayed using inductively coupled Plasma spectrophotometry and values expressed as $mg \cdot meal^{-1}$.

1.2.8 Results

Table 4 summarises the results of the chemical analysis.

TABLE 4

Chemical analysis of the meals.

| Component | Unit | Reference | PAL1 | PAL2 |
|---|---|---|---|---|
| Insoluble fibre | $g \cdot meal^{-1}$ | 1.42 | 11.7 | 12.5 |
| Soluble fibre | $g \cdot meal^{-1}$ | 1.57 | 3.1 | 5.9 |
| Total fibre | $g \cdot meal^{-1}$ | 2.99 | 14.8 | 17.7 |
| Fructose | $g \cdot meal^{-1}$ | 2.07 | 21.9 | 22.8 |
| Glucose | $g \cdot meal^{-1}$ | 0.689 | 15.7 | 14.3 |
| Lactose | $g \cdot meal^{-1}$ | nd | nd | nd |
| Maltose | $g \cdot meal^{-1}$ | nd | nd | nd |
| Sucrose | $g \cdot meal^{-1}$ | 5.58 | 3.86 | 3.51 |
| Total sugars | $g \cdot meal^{-1}$ | 8.34 | 41.5 | 40.6 |
| Starch | $g \cdot meal^{-1}$ | 41.5 | nd | nd |
| Total carbohydrate (assayed) [a] | $g \cdot meal^{-1}$ | 49.8 | 41.5 | 40.6 |
| Protein | $g \cdot meal^{-1}$ | 12.1 | 37.3 | 17.9 |
| Energy (calculated) | $kcal \cdot meal^{-1}$ | 331 | 553 | 378 |
| Sodium | $mg \cdot meal^{-1}$ | 57.8 | 278 | 96 |
| Monounsaturated fatty acid | $g \cdot meal^{-1}$ | 5.03 | 7.51 | 4.72 |
| Polyunsaturated fatty acid | $g \cdot meal^{-1}$ | 1.65 | 3.74 | 7.09 |
| Saturated fatty acid | $g \cdot meal^{-1}$ | 1.53 | 1.96 | 2.47 |
| trans-fatty acid | $g \cdot meal^{-1}$ | 0.009 | <0.14 | <0.11 |
| Total fat | $g \cdot meal^{-1}$ | 9.04 | 14.0 | 15.4 |
| ω-3/ω-6 [b] | Ratio | 1.22 | 0.61 | 2.18 |
| Apigenin | $mg \cdot meal^{-1}$ | 0.000 | 20.7 | 24.4 |
| Delphinidin | $mg \cdot meal^{-1}$ | 0.0697 | 0.0718 | n.a. |
| Epicatechin | $mg \cdot meal^{-1}$ | 0.000 | 2.53 | n.a. |
| Hesperetin | $mg \cdot meal^{-1}$ | 0.000 | 0.000 | 0.000 |
| Kaempferol | $mg \cdot meal^{-1}$ | 0.000 | 1.89 | 2.46 |
| Luteolin | $mg \cdot meal^{-1}$ | 0.000 | 12.7 | 22.5 |
| Myricetin | $mg \cdot meal^{-1}$ | 0.000 | 2.86 | 3.90 |
| Naringenin | $mg \cdot meal^{-1}$ | 0.000 | 0.000 | 0.000 |
| Phloretin | $mg \cdot meal^{-1}$ | 0.00267 | 0.000 | n.a. |

TABLE 4-continued

Chemical analysis of the meals.

| Component | Unit | Reference | PAL1 | PAL2 |
|---|---|---|---|---|
| Phloridzin | mg · meal$^{-1}$ | 0.000 | 1.33 | n.a. |
| Quercetin | mg · meal$^{-1}$ | 0.000 | 4.11 | 6.92 |
| 'Total' flavonoid aglycones | mg · meal$^{-1}$ | ≥0.0697 | ≥44.9 | ≥60.2 |
| Cyanidin-3-glucoside | mg · meal$^{-1}$ | 0.000 | 16.7 | 21.9 |
| Delphinidin-3-glucoside | mg · meal$^{-1}$ | 0.000 | 0.000 | 0.000 |
| Luteolin-7-O-glucoside | mg · meal$^{-1}$ | 0.000945 | 0.000 | n.a. |
| Malvidin-3-glucoside | mg · meal$^{-1}$ | 0.904 | 33.6 | 62.9 |
| Pelagonidin-3-glucoside | mg · meal$^{-1}$ | 0.566 | 34.6 | 61.4 |
| Quercetin-3-O-glucoside | mg · meal$^{-1}$ | 0.0165 | 1.16 | n.a. |
| 'Total' flavonoid glucosides | mg · meal$^{-1}$ | ≥1.49 | ≥86.1 | ≥146 |
| 'Total' flavonoids | mg · meal$^{-1}$ | ≥1.56 | ≥131 | ≥206 | n.a. Not analysed
nd Not detectable
'Total' The sum of the flavonoid compounds analysed. Phloridzin and phloretin are not counted as flavonoids.
$^{a}$ Total carbohydrate is the sum of starch and total sugars
$^{b}$ Calculated from the fatty acid assys

1.3 Clinical Test

A fully randomised cross-over study was carried out in which twenty-four male subjects consume the three test meals, with a two week wash out period in between each test. The subjects were used in four cohorts of 6 subjects each. Two cohorts attended each week, for six weeks, with at least a two week recovery period in between visits. The order of meal consumption was determined using a randomised Williams design within each cohort of 6 subjects. Thus within each cohort, 2 subjects tested each type of meal on each of the 3 visits, with subjects testing a different meal each visit. Subjects who dropped-out before the first measurement day were replaced by reserve volunteers who received the same parameter combination as the subject that dropped out. Subjects who withdrew from the study after receiving at least one study product were not be replaced.

1.3.1 Study Population

Twenty-four apparently healthy male subjects (+4 reserves), age 18-60 years, with a body mass index (BMI, calculated as weight/height2) between 18 and 27 kg/m2 were recruited locally. Additional inclusion/exclusion criteria are set forth hereinbelow.

Inclusion Criteria
(a) Reported dietary habits: no medically prescribed diet, no slimming diet, used to eat 3 meals a day, no vegetarian.
(b) Reported intense sporting activities no more than 10 hours/week.
(c) Reported alcohol consumption no more than 21 units/week.
(d) Currently not smoking and being a non-smoker for at least six months and no reported use of any nicotine containing products in the six months preceding the study and during the study itself.
(e) A fasting capillary blood glucose value within the local normal reference value (typically between 3.5 and 6.5 mmol/L measured by YSI 2300 Stat Plus Glucose and Lactate Analyzer).
(f) No blood donation 1 month prior to pre-study examination or during the study.

Exclusion Criteria
(a) Use of medication which interferes with study measurements (as judged by the study physician).
(b) Dislike, allergy or intolerance to test meals.
(c) Reported weight loss/gain (more than 10%) in the last six month before the study.
(d) Reported participation in another biomedical study 3 months before the start of the study.
(e) Reported participation in night shift work two weeks prior to pre-study investigation or during the study. Night work is defined as working between midnight and 6.00 AM.

1.3.2 Testing Regimen

The volunteers were instructed to minimise changes in their usual lifestyle and to avoid high intensity physical activity and alcohol consumption during the 24 hours prior to the test. They were asked to record their dietary intake during the 12 hours prior to the first test and to repeat the same dietary intake before each subsequent test. Subjects were asked to fast from 8 PM until the next morning, and only allowed to drink water. The volunteers arrived at the test facility at least 30 minutes before starting the test, always using the same mode of transportation.

Participants arrived at the test facility between 8.00 and 8.30 am. A finger prick blood sample was collected to assure that each subject is fasted. If levels of blood glucose measured using a glucometer exceeded 7 mmol/L then the subject was not be allowed to take part in the study on that occasion. Two fasting capillary glucose samples were taken on two individual finger pricks (T-15), followed by a fasting blood venous sample (T-10). Five minutes before consumption of the test meal (T-5), participants completed baseline satiety scores. Thereafter they received the test meal at T0 and consumed it all with 250 ml water within 10 minutes. Subjects were allowed to drink 150 ml water every subsequent hour after the test meal intake. The volume of water drunk during each hour of the first visit was registered and the volunteers asked to repeat during subsequent visits. Volunteers were not allowed to eat or drink anything else.

Immediately post-consumption and at regular intervals thereafter, a questionnaire on satiety was completed. Regular venous blood samples were also taken.

Compliance of the volunteers with dietary restrictions on the evening before the interventions was limited. Three of the 24 subjects dropped out and from an additional 3 subjects data had to be excluded from the per protocol analysis because they were unable to complete at least one of the meals. Volunteers had problems consuming the meals and during 11 interventions volunteers needed more than 15 minutes to eat all the food (maximum 28 minutes).

1.3.3 Sample Collection

During each of the three interventions 16 venous blood samples were collected: 8 samples of between 3 and 5 ml into tubes containing ethylene diamine tetraacetic acid (EDTA) (gut hormones) and 8 samples of between 3 and 5 ml into tubes containing heparin (insulin), a highly sulfated glycosaminoglycan widely used as an injectable anticoagulant. Immediately after collection all blood samples tubes were put in ice water. To the EDTA blood samples a protease inhibitor cocktail (Set III; EMD Chemical) were added at 1% vol/vol and the tube mixed gently by inversion.

Blood samples were centrifuged at 4 degrees Centigrade and two samples of more than 500 µl of EDTA plasma and two samples of more than 500 µl heparin plasma were frozen and stored at −70 degrees Centigrade until analysis.

1.3.4 Assays and Questionnaire

Venous plasma glucose analysis was conducted on a Horiba ABX Clinical Chemistry analyser using the commercially available Glucose PAP CP kit (ref A11A01668) from ABX Pentra.

Plasma insulin analysis was carried out for using an IMMULITE 2000 Systems analyser based on a solid phase enzyme-labelled chemiluminescent immunometric assay, requiring 100 µl heparinised plasma. Its reportable range is 2-300 µIU/ml and analytical sensitivity is 2 µIU/ml.

Analysis of Peptide YY (PYY), Glucagon-like Peptide-1 (GLP-1) and Gastric Inhibitory Polypeptide (GIP) gut hormones was performed on venous blood plasma using a MILLIPEX MAP Human Gut Hormone Panel product number HGT-68K, manufactured by Millipore and run on Luminex® xMAP® platform. This is a multiplex immunoassay array kit used to measure Ghrelin, Leptin, Glucose-Dependent Insulinotropic polypeptide (GIP), glucagon-like peptide-1 (GLP-1), Amylin (active and total), Pancreatic Polypeptide (PP), peptide YY (PYY), and insulin in human plasma.

Ratings of satiety feelings (how hungry are you, how full are you and how strong is your desire to eat) were scored using reproducible and valid scales (Flint A, Raben A, Blundell J E, Astrup A. "Reproducibility, power and validity of visual analogue scares in assessment of appetite sensations in single test meal studies", International Journal Of Obesity, 24, 38-48 (2000); Stubbs R J, Hughes D A, Johnstone A M et al. "The use of visual analogue scales to assess motivation to eat in human subjects: a review of their reliability and validity with an evaluation of new hand-held computerized systems for temporal tracking of appetite ratings", British Journal of Nutrition, 84, 405-15 (2000)) and were measured by means of a Visual Analogue Scale of 1-100(%) scales using EVAS (Electronic Visual Analogue Scale, iPAQ) (Stratton R J, Stubbs R J, Hughes D, King N, Blundell J E, Elia M. "Comparison of the traditional paper visual analogue scale questionnaire with an Apple Newton electronic appetite rating system (EARS) in free living subjects feeding ad libitum", European Journal Of Clinical Nutrition, 52, 737-41 (1998)) anchored at the low end with the most negative or lowest intensity feelings (e.g. not at all), and with opposing terms at the high end (e.g. very high, extreme). Volunteers were asked to indicate on a line which place on the scale best reflects their feelings at that moment. Scores were collected so that they cannot be used as a further reference for later scores. The volunteers completed the questionnaires pre- and at regular intervals post-consumption (5, 10, 25, 40, 55, 85, 115, 175 minutes).

1.3.5 Results

The results of the per protocol analysis population are reported below.

The effects of the meal type on peak glucose response, insulin incremental area under the plasma concentration versus time curve, peak insulin response and satiety scores were assessed using a mixed model analysis of variance, with subject as a random effect, product as a fixed effect and baseline (fasting score) as a covariate. The order of product testing, gender and BMI/weight (at start of study) were also initially fitted as covariates and retained in the model if required. No adjustments were made for multiplicity testing.

FIG. 1 shows the net incremental area under the concentration versus time curve for 0-2 hours for insulin results gave also gave a similar picture for all three interventions. The net incremental area under the concentration versus time curve for 0-2 hours for insulin PAL1 and PAL2 (2420 and 1950 min·mIU/L, respectively) were not significantly different from the value of 2141 min·mIU/L obtained for the Reference meal (P=0.35 and P=0.52 for PAL1 and PAL2, respectively versus Reference meal at 95% confidence limits).

However table 5 shows that peak insulin values (µIU/L) for the three meals between 0 (baseline before the meals) and 180 minutes after commencing meal consumption did show a difference with PAL2 showing a statistically significant different value (38 µIU/L for PAL2 against 49.3 µIU/L for Reference meal P=0.024 at 95% confidence limits).

TABLE 5

Peak insulin values (µIU/L) between 0 (baseline before the meals) and 180 minutes after commencing meal consumption. P was calculated at 95% confidence limits.

| Meal | n | Mean (µIU/L) | Standard error of mean (µIU/L) | Mean change from Reference (µIU/L) | Standard error of change (µIU/L) | Lower confidence interval for change (µIU/L) | Upper confidence interval for change (µIU/L) | % change from control | P-value |
|---|---|---|---|---|---|---|---|---|---|
| PAL1 | 18 | 44.2 | 4.56 | −5.1 | 4.77 | −14.8 | 4.6 | −10.3 | 0.2958 |
| PAL 2 | 20 | 38.0 | 4.45 | −11.4 | 4.80 | −21.1 | −1.6 | −23.0 | 0.0241 |
| Reference | 20 | 49.3 | 4.29 | . | . | . | . | . | . |

Figure 2:
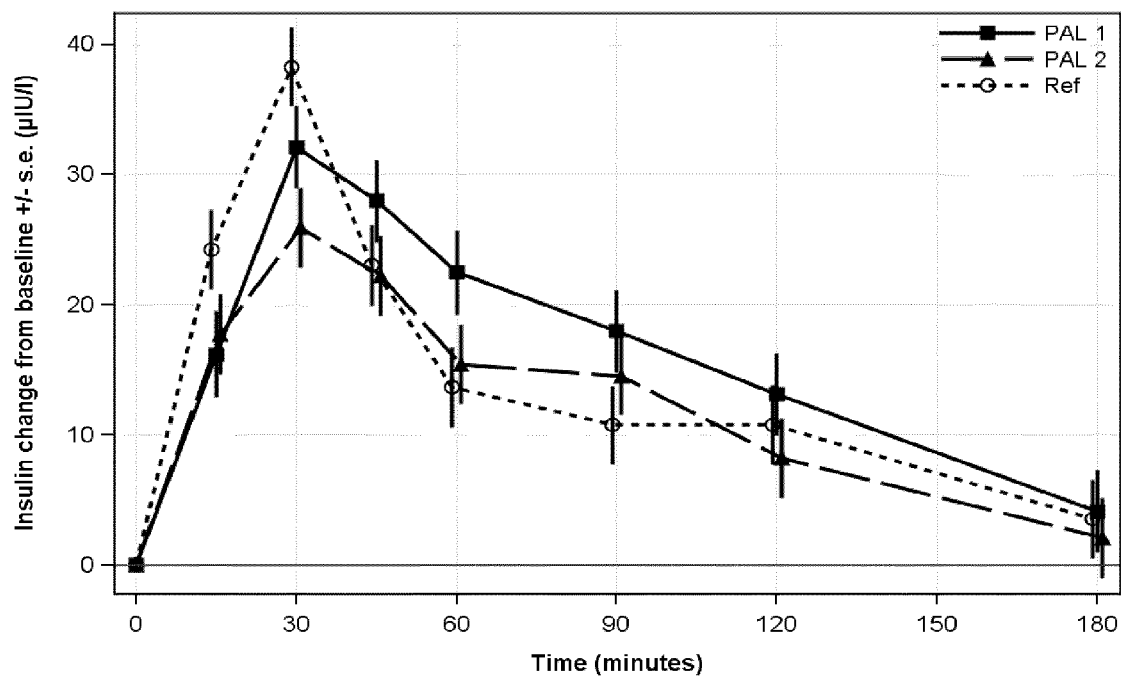
FIG. 2 venous plasma insulin changes from baseline (μIU/L) between 0 (baseline before the meals) and 180 minutes after commencing meal consumption.

The decline in insulin from the peak also shows a gentler slope as shown in FIG. 2 for both PAL1 and PAL2 demonstrating a more controlled insulin response for both of these meals with respect to the Reference (Ref) meal. This less steep decline of the peak is the reason why the net incremental area under the concentration versus time curve for 0-2 hours for insulin PAL1 and PAL2 does not differ from the Reference meal (see FIG. 1) and the curve shape shows a clearer picture of overall insulin control benefit of the PAL1 and PAL2 meals.

Figure 3:
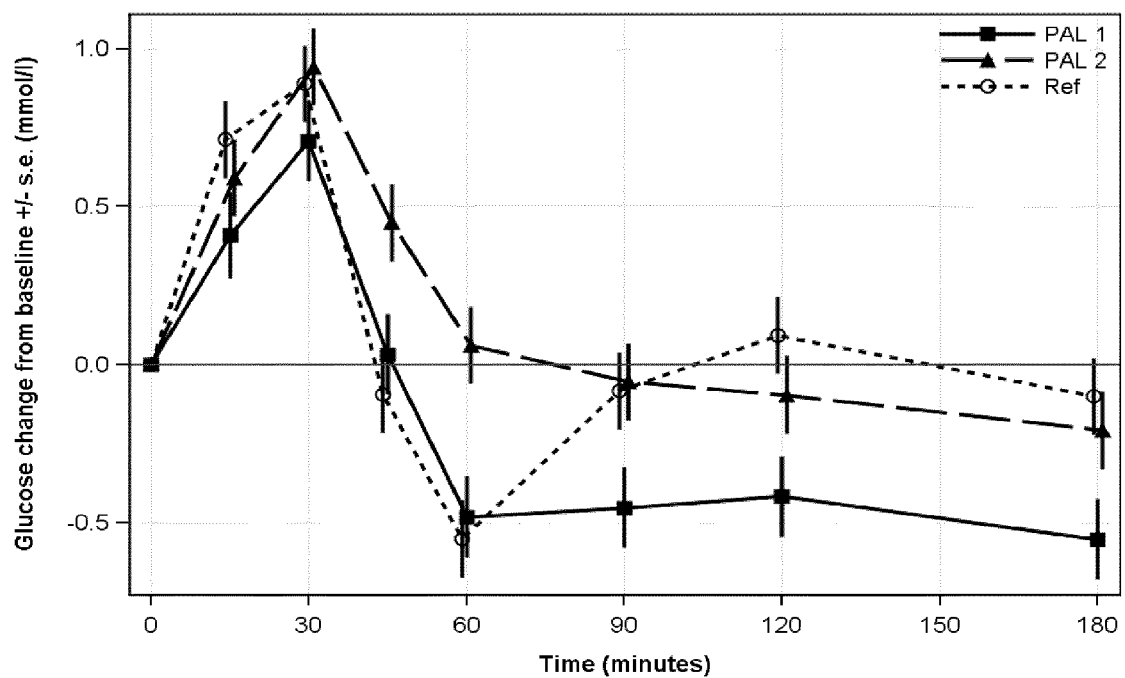
FIG. 3 venous plasma glucose changes from baseline (mmol/L) between 0 (baseline before the meals) and 180 minutes after commencing meal consumption.

FIG. 3 shows the change in venous glucose levels (mmol/l) from an initial baseline over 180 minutes and Table 6 shows that differences in peak glucose values (mmol/L) for the three meals between 0 (baseline before the meals) and 180 minutes after commencing meal consumption between all three meals was not significant (6.2 mmol/L for PAL1 and 6.4 mmol/L for PAL2 against 6.5 mmol/L for Reference meal P=0.0596 and 0.5297 respectively at 95% confidence limits).

TABLE 6

Peak venous blood glucose values (mmol/L) between 0 (baseline before the meals) and 180 minutes after commencing meal consumption. P was calculated at 95% confidence limits.

| Meal | N | Mean (mmol/L) | Standard error of mean (mmol/L) | Mean change from Reference (mmol/L) | Standard error of change (mmol/L) | Lower confidence interval for change (mmol/L) | Upper confidence interval for change (mmol/L) | % change from control | P-value |
|---|---|---|---|---|---|---|---|---|---|
| PAL 1 | 18 | 6.2 | 0.11 | −0.3 | 0.13 | −0.5 | 0.0 | −3.9 | 0.0596 |
| PAL 2 | 20 | 6.4 | 0.11 | −0.1 | 0.13 | −0.3 | 0.2 | −1.2 | 0.5297 |
| Ref | 20 | 6.5 | 0.10 | . | . | . | . | . | . |

Whilst the peak venous blood glucose values for venous glucose were not significantly different between the PAL meals and the Reference, the PAL 2 glucose curve shows a much gentler decline between 30 and 60 minutes than for PAL 1 and Reference, and furthermore, unlike the other two curves, never goes significantly below baseline to show a post prandial "dip". This is likely to be related to the lower insulin peak shown in FIG. 1.

Figure 4:
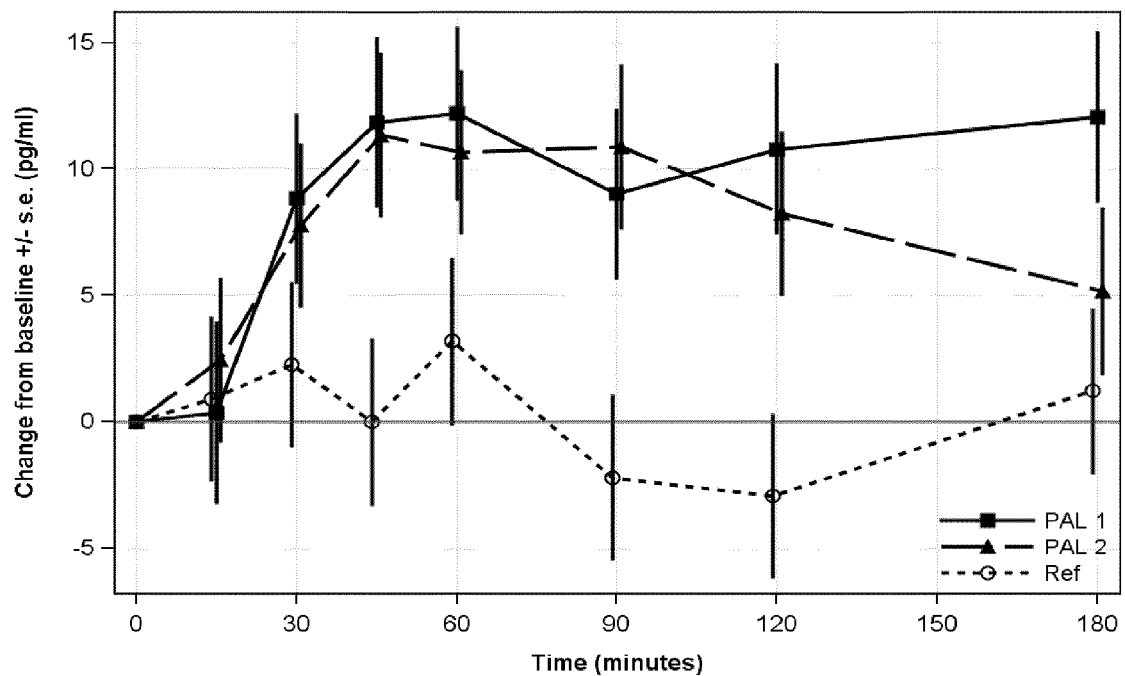
FIG. 4 PYY plasma levels (pmol/ml) changes from baseline between 0 (baseline before the meals) and 180 minutes after commencing meal consumption.

FIG. 4 shows the change in venous PYY levels (pg/ml) from an initial baseline over 180 minutes. According to Pedersen-Bjergaard et al (Scand J Clin Lab Invest, 56, 497-503 (1996)), PYY is released post-prandially in proportion to caloric intake. Although not affected by gastric distension, according to Batterham et al (Nature, 418, 650-654 (2002)), it has been shown to play a role in satiety and appetite reduction. Lower PYY levels appear to be linked to insulin resistance in non diabetic relatives of diabetics. The considerably higher levels of PYY seen for both PAL meals correlate to the results reproduced in FIG. 7, which is to be expected given the role of PYY in satiety. However the similarity in response for PAL 1 and PAL 2 suggests that the caloric and protein differences have not had an impact on this difference as would be expected from the cited literature. That, combined with the caloric match between PAL 2 and Reference, suggests that some feature of the PAL meals may be influencing the PYY response.

Figure 5:
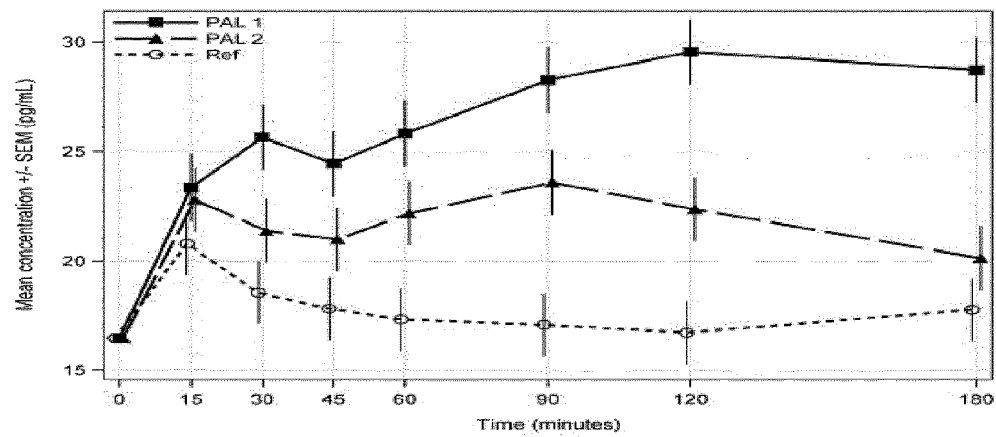
FIG. 5 GLP-1 plasma levels (pmol/ml) changes from baseline between 0 (baseline before the meals) and 180 minutes after commencing meal consumption.

FIG. 5 shows the GLP-1 data and shows that both PAL meals give an increased response over the Reference meal. Neff et al (Diabetes, Metabolic Syndrome and Obesity: Targets and Therapy, 3, 263-273 (2010)) discloses that GLP-1 has a secondary role in satiety in that it feeds back to the ileal brake mechanism, slowing down peristalsis and also signalling feelings of satiety to the brain. The higher levels of GLP-1 for both PAL meals in the role of satiety are reflected in the results reproduced in FIG. 7. According to Nauck et al (Diabetologia, 54, 10-18 (2011)) GLP-1 is progressively reduced as part of the physiopathology of type 2 diabetes, and according to le Roux et al (Ann Surg, 243:108-14 (2006)) an increase in GLP-1 is also one of the first effects noticed, along with improved glucose tolerance, in patients who have undergone Roux-en-Y bariatric surgery, suggesting that the ability of the PAL meals to induce GLP-1 would have benefits for both diabetics and also those exhibiting earlier stages of poor glucose control.

Figure 6:
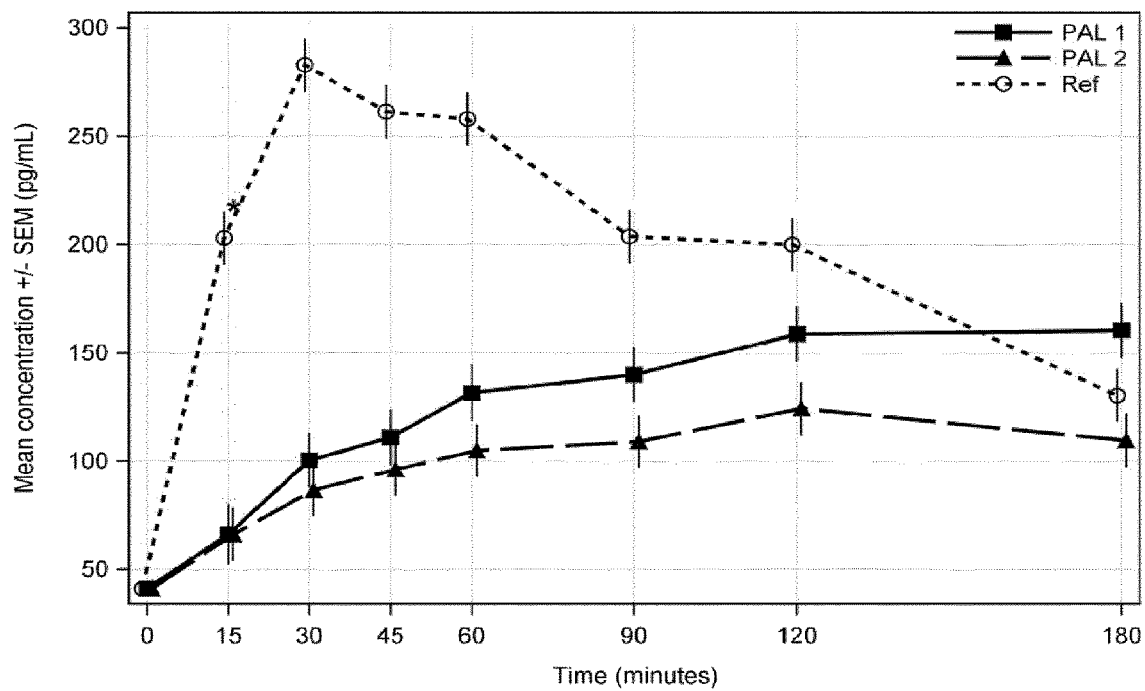
FIG. 6 GIP plasma levels (pmol/ml) changes from baseline between 0 (baseline before the meals) and 180 minutes after commencing meal consumption.

FIG. 6 shows the GIP response for the three meals and unexpectedly shows a considerable suppression of GIP in both PAL meals. According to [06] Drucker (J of Clin Inv, 117, 24-32 (2007)) GIP is produced by the K cells of the small intestine, and is thought to be triggered by the transport of glucose into the K cells from where it is transported to the pancreas and induces insulin as part of the incretin response. Unlike GLP-1 and PYY, GIP is not thought to play a role in satiety signalling or the Ileal brake mechanism. The reduction of GIP response in the two PAL meals, despite the high levels of free glucose that would be expected to induce GIP suggests that inhibition of glucose transporters on the K cells by other ingredients in these meals may be the mechanism leading to this inhibition. Gorboulev et al (Diabetes, 61, 187-196 (2012)) report reduced levels of GIP in glucose fed Sodium-Glucose Linked Transporter 1 (SGLT-1) knockout mice which may suggest one possible mechanism for the reduction in GIP. Miyawaki, K et al (Nature Medicine, 8, 738-742 (2002)) report the presence of GIP receptors in adipose tissue. Thus GIP may facilitate the uptake of dietary lipids and sugars from the blood into the adipose tissue and promotes weight gain. This pattern of reduced GIP, and raised PYY and GLP-1 is similar to that observed in Roux-en Y bariatric surgery patients, where Korner J et al (Surg Obes Relat Dis, 3, 597-560 (2007)) showed an associated with improved diabetes symptoms and weight loss.

Figure 7:
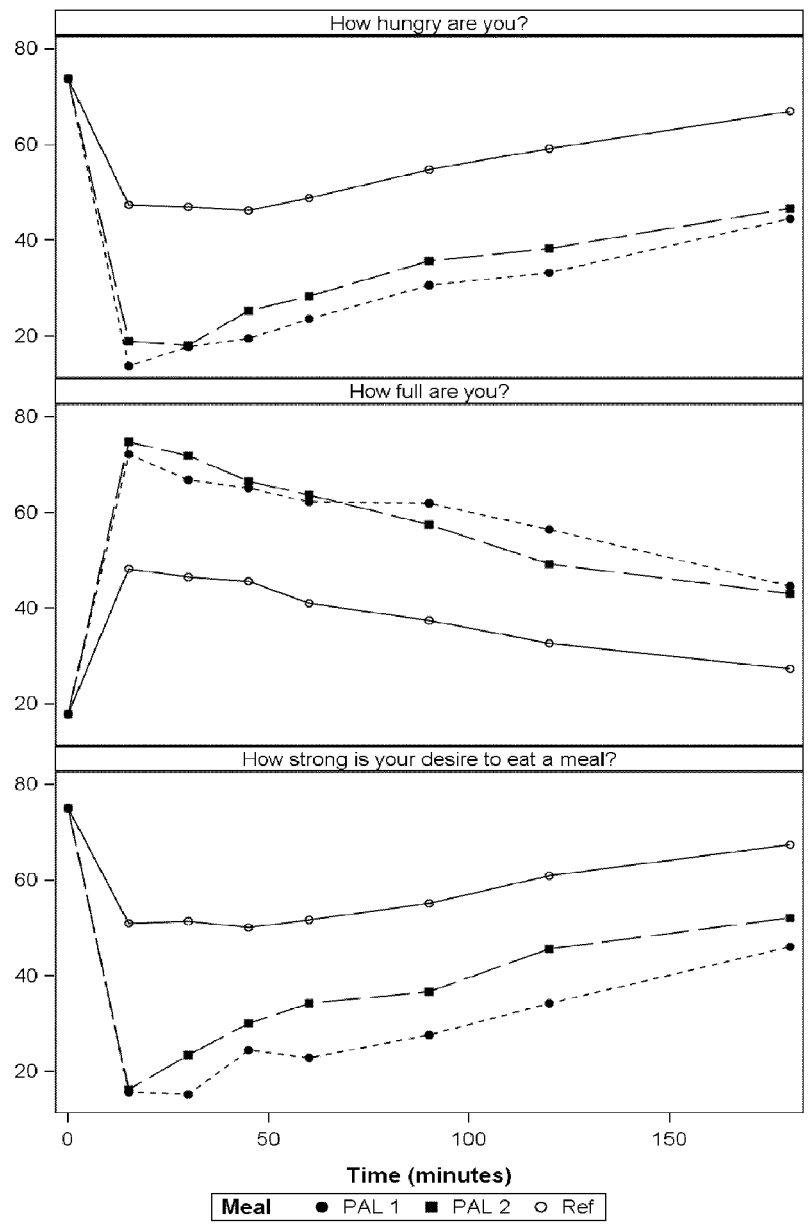
FIG. 7 mean self-assessed scores of "hunger", "fullness" and "desire to eat" (%) between 0 (baseline before the meals) and 180 minutes after commencing meal consumption.

FIG. 7 shows that the satiety results indicate remarkable differences between the Reference meal and both PAL1 and PAL2. The "hunger" and "desire to eat" self-assessed scores decreased (see FIGS. 7A and 7C) and the "fullness" self-assessed score increased (see FIG. 7B) much more prominently with PAL1 and PAL2 when compared to the Reference meal (Ref). The mean scores remained clearly different until the end of the measurements at 3 hours after start of meal. The area under the curve for all three scores (hunger, fullness, desire to eat) was significantly different for the Reference when compared to both PAL1 and PAL2 at 2 hours as well as at 3 hours (all P<0.0001 at 95% confidence limits).

1.3.6 Discussion

The insulin peak at 30 minutes is significantly lower in PAL2 with respect to the Reference meal which, as these two meals were the most matched for protein and energy as well as carbohydrate, suggests a strong health benefit for the PAL 2 meal. Insulin levels were also better controlled in terms of a steady decline for both PAL 1 and PAL 2 across the full 180 minutes of the study, again, showing a benefit in terms of insulin metabolic control.

Both PAL1 and PAL2 showed a prominent decrease in mean self-assessed scores for "hunger" and "desire to eat" and an increase in "fullness" when compared to the Reference meal. The changes were seen immediately after the meals had been ingested and remained present throughout the full 180 minute period after the meals. Note that while both PAL1 and PAL2 had higher cooked weights (680 grams and 580 grams for PAL1 and PAL2 respectively versus 250 g for the Reference meal) the energy content for the PAL2 and the Reference meal were very similar. This difference between the PAL1/PAL2 and the Reference meal is likely to be predominantly down to the caloric density difference between the meals (0.8 and 0.65 Kcal/g for PAL1 and PAL2 respectively and 1.3 Kcal/g for the Reference meal), but the similarities between PAL1 and PAL2 suggest that protein has less of an influence and it is also possible that the high phytochemical content has a role in the fact that satiety levels are still high even after 180 minutes.

Differences between the Reference meal and PAL1 and PAL2 comprise lower fibre and flavonoids and higher starch in the Reference meal compared with the other two. The starch is likely to be digested rapidly to sugar, and as available carbohydrate across all three meals is very similar, it is unlikely that this difference would cause either the lower insulin peak at 30 minutes for PAL2 or the higher PYY figure observed at 30 minutes onwards for both PAL1 and PAL2. Fibre could be considered a factor, however the data of Jonsson et al (2010) suggests that fibre is not a factor in the increased satiety observed in diets with high fruit and vegetable content.

Similarly, both PAL 1 and PAL 2 show increases in PYY, GLP-1 and decreases in GIP when compared with the Reference meal. All three of these results can be considered as favourable health outcomes. Whilst not wishing to be bound by any particular theory, the inventors believe that a possible explanation is that flavonoids or other phenolics in PAL 1 and PAL 2 activate receptors in the gut and these are responsible for the changes in hormones in the blood.

1.3.7 Conclusion

While overall insulin levels as expressed by net incremental area under the concentration versus time curve for 0-2 hours are not significant for PAL 1 or PAL 2 in respect of the Reference meal, the insulin release as defined by the graph shape in FIG. 2 shows improved insulin control for PAL 1 and PAL 2 with respect to the Reference meal. This is also reflected in the significantly lower peak insulin at 30 minutes for PAL 2.

Highly significant differences in area under the curve for the time period 0-120 minutes for satiety scores were observed which remained significant until the end of the measurements at 180 minutes.

It has been suggested by Cordain that the high protein content of Palaeolithic type diets are responsible for the satiating effect, however to date there has been no study of a high versus low protein Palaeolithic meal such as PAL 1 and PAL 2, and the similarity of both the PYY data and the satiety results, despite the higher protein and calorie content of PAL 1 suggests this assumption to be erroneous. This leaves us to conclude that the key difference is the flavonoids.

Example 2

2.1 Preparation of Meals

Reference and PAL 2 meals were prepared as previously described. The dinner from Table 3 of Jew et al referenced above was prepared.

2.2 Organic Extractions

Fractions of the meals were prepared by the method of Tumbas et at (Acta Periodica Technologica 35 265-273 (2004)). Briefly, a sample of the freeze-dried meal was ground in a pestle and mortar and 10 g added to 250 ml of 70% (v/v) aqueous methanol and stored at room temperature for 24 hours under nitrogen in the dark. The supernatant was removed and stored at −20° C. under nitrogen in the dark. The extraction was repeated with a further 250 ml of aqueous methanol, and the supernatants combined.

Methanol was removed from 20% of the extract by rotary evaporation under vacuum at 40° C., with residual water being removed by freeze-drying. The lyophilized extract was stored at −20° C. in the dark under nitrogen, labelled as 'aqueous methanol extract'.

Methanol was removed from the remaining 80% of the extract by rotary evaporation under vacuum at 40° C. and this aqueous extract sequentially extracted with 2×10 ml volumes of petroleum ether (40-60° C.), dichloromethane, ethyl acetate, and 1-butanol. The organic extracts were dried at 40° C. under a stream of nitrogen and the lyophilised samples labelled accordingly and stored at −20° C. under nitrogen in the dark.

Residual solvent was removed from the remaining unextracted portion by rotary evaporation and the aqueous solution was freeze-dried. The lyophilised sample was labelled as 'water extract' and stored at −20° C. under nitrogen in the dark.

Extractions yielded the quantities of material set forth in Table 7.

TABLE 7

Solvent extractions of Reference and PAL2 meals and the dinner disclosed in Table 3 of Jew et al.

| | Weight (mg) | | |
|---|---|---|---|
| Solvent | Reference | PAL2 | Jew |
| Aqueous methanol | 284.6 | 1216.6 | 402.1 |
| Petroleum ether (40-60° C.) | 12.2 | 30.1 | 10.9 |
| Dichloromethane | 19.6 | 6.7 | 18.4 |
| Ethyl acetate | 3.1 | 8.5 | 32.0 |
| 1-Butanol | 28.9 | 141.5 | 40.3 |
| Water | 1021.3 | 4291.3 | 1868.0 |

2.3 Flavonoid Content of Fractions

Flavonoid content was assayed by the method of Velioglu et al (J. of Agricultural and Food Chem., 46, 4113-4117 (1998)). While this method assays the phenolic content of extracts, due to the non-acidified, room-temperature, aqueous methanolic extraction used, bound polyphenols and highly lipophilic antioxidants will not be extracted, and the values obtained will reflect the flavonoid content of the meals. Samples were redissolved in 70% aqueous methanol at 1 mg·ml$^{-1}$ and 200 µl added to 1.5 ml of freshly-prepared 10% aqueous Folin-Ciocalteu reagent, mixed and allowed to stand at room temperature for exactly 5 minutes. 1.5 ml of 6% (w/v) sodium bicarbonate solution was added, mixed and allowed to stand at room temperature for 90 minutes. The absorbance at 765 nm was compared with 0-0.3 mg·ml$^{-1}$ gallic acid standards in 70% aqueous methanol and expressed as Gallic Acid Equivalents.

TABLE 8

Flavonoid content of solvent extractions of Reference and PAL2 meals and the dinner disclosed in Table 3 of Jew et al.

| Sample | Solvent | GAE (mg · meal$^{-1}$) | GAE (mg · 650 Kcal meal$^{-1}$) |
|---|---|---|---|
| Reference | Aqueous methanol | 78 | 156 |
| | Petroleum ether (40-60° C.) | 1 | 2 |
| | Dichloromethane | 4 | 7 |
| | Ethyl acetate | 2 | 3 |
| | 1-Butanol | 5 | 10 |
| | Water | 48 | 95 |
| PAL2 | Aqueous methanol | 658 | 1132 |
| | Petroleum ether (40-60° C.) | 14 | 24 |
| | Dichloromethane | 9 | 15 |
| | Ethyl acetate | 17 | 29 |
| | 1-Butanol | 145 | 249 |
| | Water | 467 | 802 |
| Jew | Aqueous methanol | 641 | 404 |
| | Petroleum ether (40-60° C.) | 5 | 3 |
| | Dichloromethane | 9 | 5 |
| | Ethyl acetate | 31 | 19 |
| | 1-Butanol | 89 | 56 |
| | Water | 500 | 315 |

2.4 Flavonoid Content of Meals

Samples were assayed by a method based on Velioglu et al. Briefly, freeze-dried samples were ground in a pestle and mortar and 2.5 g added to 25 ml of 70% aqueous methanol and shaken in a sealed centrifuge tube for 2 hours at room temperature. The suspension was centrifuged at 13,000×g for 1 minute and the supernatant removed. 200 μl of the supernatant was assayed as for the fractions. Values are expressed as the amount in a 650 Calorie meal.

TABLE 9

Flavonoid content of Reference and PAL2 meals and the dinner disclosed in Table 3 of Jew et al.

| Meal | GAE (mg · 650 Kcal meal$^{-1}$) |
|---|---|
| Reference | 54.8 |
| PAL1 | 504 |
| PAL2 | 803 |
| Jew | 320 |

TABLE 10

Assayed nutrient levels normalised to 650 Kcal for the Reference, PAL 1 and PAL 2 meals and the dinner disclosed in Table 3 of Jew et al.

| Component | Analysis | | | |
|---|---|---|---|---|
| | Reference | PAL1 | PAL2 | Jew |
| Fibre (g 650 Kcal meal$^{-1}$) | 6.4 ± 1.2 | 20.9 ± 2.0 | 26.0 ± 7.4 | 10.1 ± 7.8 |
| Protein (g 650 Kcal meal$^{-1}$) | 23.3 ± 1.8 | 51.8 ± 2.9 | 29.1 ± 2.1 | 65.5 ± 1.1 |
| Starch (g 650 Kcal meal$^{-1}$) | 74.0 ± 7.8 | <3.6 | <4.0 | <3.0 |
| Lactose (g 650 Kcal meal$^{-1}$) | <0.2 | <0.2 | <0.2 | <0.1 |
| Flavonoids (mgGAE · 650 Kcal meal$^{-1}$) | 54.8 | 504 | 803 | 320 |

2.5 GPCR

G-protein Coupled Receptor (GPCR) activation has been demonstrated to induce secretion of a number of substances in the gastrointestinal tract. In particular, Suzuki (Peptides, 25(10), 1803-8 (2004)) and Renuka (Neurochem Res, 31(3), 313-20 (2006)) disclose that GPR14 and M1 and M3 Muscarinic Receptors have been implicated in blood glucose control via both regulation of incretin and gut hormone (PYY, GLP-1 and GIP) secretion and potentiation of glucose stimulated insulin secretion, thus suggesting that compounds that lead to activation of these receptors to be of interest as a therapeutic agent for diabetes.

Commercial GPCR screening was carried out by EMD Millipore Corporation. Extracts were prepared in DMSO and ultimately prepared in EMD Millipore's GPCRProfiler® Assay Buffer to concentrations that were three-fold higher than the final assay concentration. Similarly, vehicle controls and positive controls were prepared to ensure all assays were properly controlled. All wells were prepared using EMD Millipore's GPCRProfiler® Assay Buffer. The GPCRProfiler® Assay Buffer was a modified Hanks Balanced Salt Solution (HBSS) where HBSS was supplemented to contain 20 mM HEPES and 2.5 mM Probenecid at pH 7.4. Assays were performed using Millipore's stable Chemiscreen™ GPCR cell lines that are validated to work in the presence of up to 0.5% DMSO to minimize vehicle response and maximize result consistency.

Extracts were plated in duplicate for each concentration assayed. Standard reference agonists (human Urotensin II for GPR14 and Acetylcholine for M1 and M3 Muscarinic Receptors) for each GPCR assayed were prepared in a similar manner to serve as assay controls. The reference agonist for each GPCR was included at Emax (the concentration where the reference agonist elicited a maximal response). The agonist assay was conducted on a FLIPRTETRA instrument where the test extracts, vehicle controls, and Emax of the reference agonist were added to the assay plate after a fluorescence baseline was established. The agonist assay was a total of 180 seconds and was used to assess each extract's ability to activate GPR14, M1 and M3 Muscarinic Receptors. Upon completion of the agonist assay, the assay plate was removed from the FLIPRTETRA and incubated at 25° C. for two minutes.

All assay plate data were subjected to appropriate baseline corrections. After baseline corrections were applied, maximum fluorescence values were exported and data processed to calculate percentage activation (relative to Emax reference agonist and vehicle control values) and additional statistical values (i.e. Z', percentage variation between replicate data values) calculated to assess the quality of each plate. Where assay plate data were rejected, additional experiments were conducted.

Figure 8:
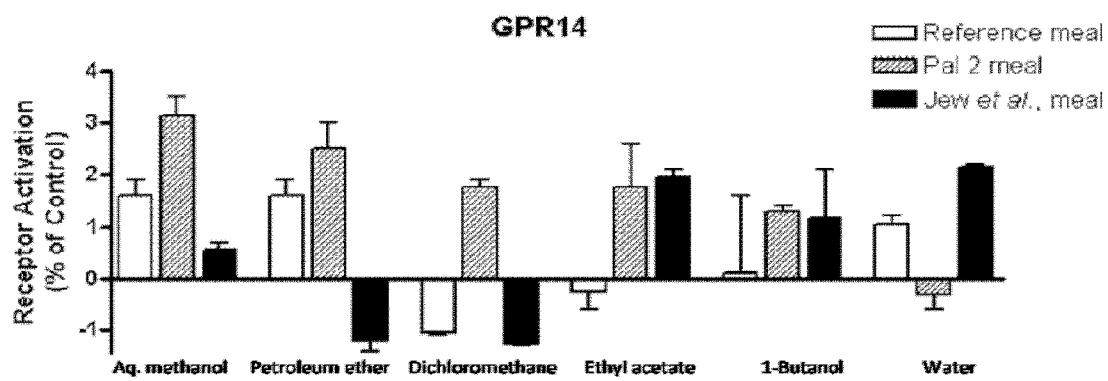
FIG. 8 activation of GPR14 receptor by Reference, PAL 2 and Jew et al. dinner extracts expressed as a percentage relative to the activation of the EC80 concentration of reference agonist (40 μg/ml aqueous methanol extract, 8 μg/ml petroleum ether extract, 8 μg/ml dichloromethane extract, 4 μg/ml ethyl acetate extract, 40 μg/ml 1-butanol extract and 40 μg/ml water extract)

FIG. 8 shows activation of GPR14 receptor by Reference, PAL 2 and Jew et al. dinner extracts expressed as a percentage relative to the activation of the EC80 concentration of reference agonist (40 μg/ml aqueous methanol extract, 8 μg/ml petroleum ether extract, 8 μg/ml dichloromethane extract, 4 µg/ml ethyl acetate extract, 40 µg/ml 1-butanol extract and 40 µg/ml water extract). It can be seen that the aqueous methanol, petroleum ether and dichloromethane extracts of PAL 2 show greater agonist activity towards the GPR14 receptor then the same extracts of the Reference and Jew et al. dinner. The ethyl acetate and 1-butanol extracts of PAL 2 and Jew et al. dinner demonstrate comparable agonist activity towards the GPR14 receptor and are more potent that the Reference extract. Only in the water extract does the Jew et al. dinner demonstrate greater agonist activity than the PAL 2 extract.

Figure 9:
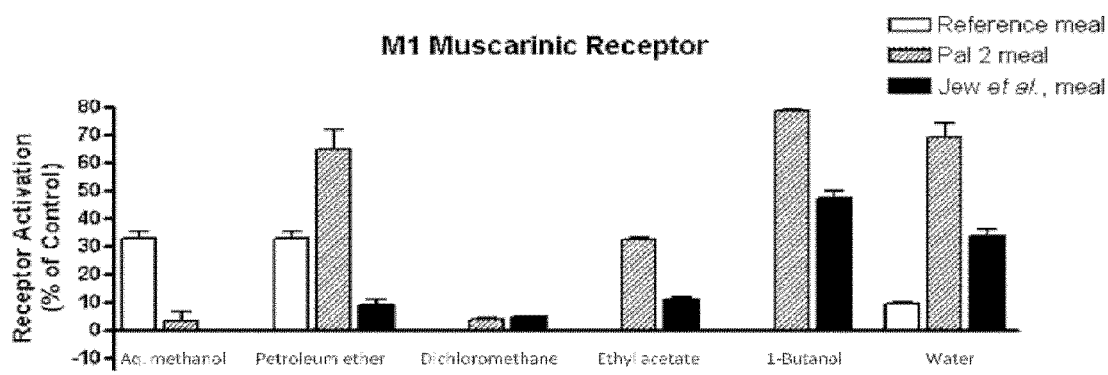
FIG. 9 activation of M1 Muscarinic receptor by Reference, PAL 2 and Jew et al. dinner extracts expressed as a percentage relative to the activation of the EC80 concentration of reference agonist (40 μg/ml aqueous methanol extract, 8 μg/ml petroleum ether extract, 8 μg/ml dichloromethane extract, 4 μg/ml ethyl acetate extract, 40 μg/ml 1-butanol extract and 40 μg/ml water extract)

FIG. 9 shows activation of M1 Muscarinic receptor by Reference, PAL 2 and Jew et al. dinner extracts expressed as a percentage relative to the activation of the EC80 concentration of reference agonist (40 µg/ml aqueous methanol extract, 8 µg/ml petroleum ether extract, 8 µg/ml dichloromethane extract, 4 µg/ml ethyl acetate extract, 40 µg/ml 1-butanol extract and 40 µg/ml water extract). It can be seen that all extracts, except the dichloromethane extract in which the agonist activity toward the M1 Muscarinic receptor is comparable, PAL 2 extracts display greater agonist activity than the Jew et al. dinner extracts.

Figure 10:
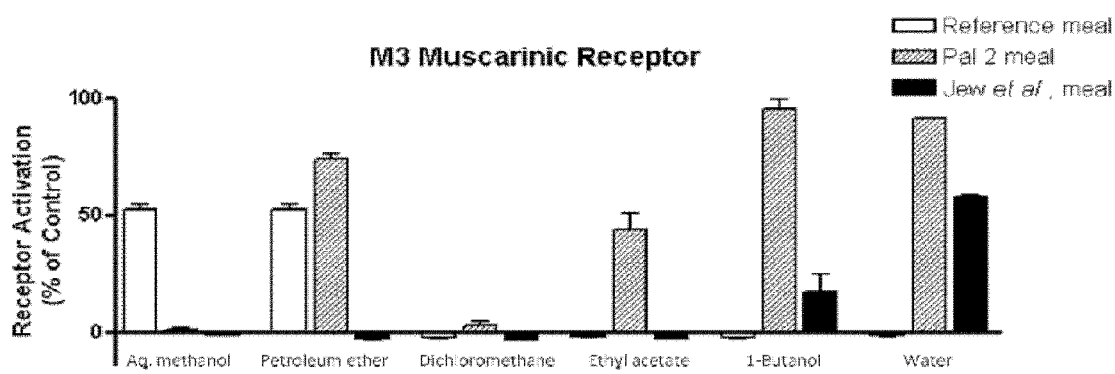
FIG. 10 activation of M3 Muscarinic receptor by Reference, PAL 2 and Jew et al. dinner extracts expressed as a percentage relative to the activation of the EC80 concentration of reference agonist (40 μg/ml aqueous methanol extract, 8 μg/ml petroleum ether extract, 8 μg/ml dichloromethane extract, 4 μg/ml ethyl acetate extract, 40 μg/ml 1-butanol extract and 40 μg/ml water extract)

FIG. 10 shows activation of M3 Muscarinic receptor by Reference, PAL 2 and Jew et al. dinner extracts expressed as a percentage relative to the activation of the EC80 concentration of reference agonist (40 µg/ml aqueous methanol extract, 8 µg/ml petroleum ether extract, 8 µg/ml dichloromethane extract, 4 µg/ml ethyl acetate extract, 40 µg/ml 1-butanol extract and 40 µg/ml water extract). It can be seen that all PAL 2 extracts display greater agonist activity than the Jew et al. dinner extracts towards M3 Muscarinic receptor. PAL 2 also shows greater activity towards M3 Muscarinic receptor than the Reference meal extracts in all extracts except the aqueous methanol extract.

2.6 Glucose Transport Inhibition 2.6.1 Routine Cell Culture

Human epithelial colorectal adenocarcinoma (Caco-2) cells were obtained from the American Type Culture Collection (ATCC) and cultured in Growth Medium consisting of Dulbecco's modified Eagle's medium (containing Glutamax-1, 4.5 g/L D-glucose and 25 mM 4-(2-hydroxyethyl)-1-piperazine ethanesulphonic acid (Hepes) (Invitrogen)), 10% foetal bovine serum (Sigma), 1% non-essential amino acids (Invitrogen) and 1 mM sodium pyruvate (Sigma)). The cells were routinely passaged at approximately 80% confluence using TrypLE™ Express Stable Trypsin-Like Enzyme (Invitrogen) to detach the cells, and seeded at approximately 114 cells per $mm^2$ in fresh tissue culture flasks. Only cells between the passage numbers 45 and 49 were used for experiments.

2.6.2 Preparation of Differentiated Caco-2 Cell Monolayers

Corning® HTS Transwell® 96 well permeable insert supports (Sigma) were collagen coated with 40 µl of 50 µg/ml rat tail collagen type I (BD Biosciences) in 0.02 M acetic acid for one hour at room temperature under sterile conditions. The inserts were washed twice in phosphate buffered saline (PBS (Invitrogen)) and the Caco-2 cells seeded into the inserts at $9.6 \times 10^5$ cell/ml (75 µl per insert) in Growth Medium and 30 ml of Growth Medium added to the feeder plate below. The cells were left to attach to the collagen matrix and form monolayers over 48 hours at 37° C., 5% $CO_2$. Both inserts and feeder plate were washed in PBS and the cells incubated with BD Entero-STIM™ Enterocyte Differentiation Medium containing MITO+™ Serum Extender solution (both BD Biosciences), 75 µl per insert and 30 ml in the feeder plate, for a further 48 hours at 37° C., 5% $CO_2$.

2.6.3 Glucose Transport Inhibition Assay

Differentiated cell monolayers were washed gently in Dulbecco's Phosphate Buffered Saline containing $CaCl_2$ and $MgCl_2$ (PBS(+) (Invitrogen)) and the inserts transferred to a new Corning® HTS Transwell®-96 well receiver plate (Sigma). The cells were incubated with fresh PBS(+) (75 µl per insert and 225 µl per well) for 60 minutes at 37° C., 5% $CO_2$. The PBS(+) was gently aspirated and replaced with 75 µl per insert of 5 mM D-glucose (Sigma)±test active in triplicate and 225 µl per well of PBS(+) quickly added to each well. The 5 mM glucose wells were incubated at 37° C., 5% $CO_2$ for 15 minutes. The cell inserts were transferred to a new receiver plate, the supernatant gently aspirated from the cells and replaced with 100 µl of 100 µM of Lucifer Yellow (Sigma) solution to confirm the integrity of the monolayers. 225 µl of PBS(+) was added to each well and incubated at 37° C., 5% $CO_2$ for 1 hour. The cell inserts were then discarded and the permeability of the membranes to Lucifer Yellow checked by measuring the fluorescence of the samples at 485 nm (excitation) and 530 nm (emission) on a Spectramax Gemini EM fluorescence microplate reader.

2.6.4 Glucose Assay

The amount of glucose transported across the cell monolayers was measured using a glucose assay based on Invitrogen's Amplex Red Glucose/Glucose oxidase Assay Kit. Briefly, 50 µl of each test sample was transferred to a black sided/clear bottom 96-well plate (Greiner Bio-One) to which 100 µl of reaction buffer (0.5 µl 10 mM Ampliflu Red, 1 µl 10 U/ml Horse Radish peroxidase, 1 µl 100 U/ml glucose oxidase and 97.5 µl PBS (all Sigma)) was added. After 10 minutes incubation at room temperature, the fluorescence of the samples was measured at 530 nm (excitation) and 590 nm (emission) on a Spectramax Gemini EM fluorescence microplate reader and the glucose concentration extrapolated from a standard curve.

2.6.5 Results

Figure 11:
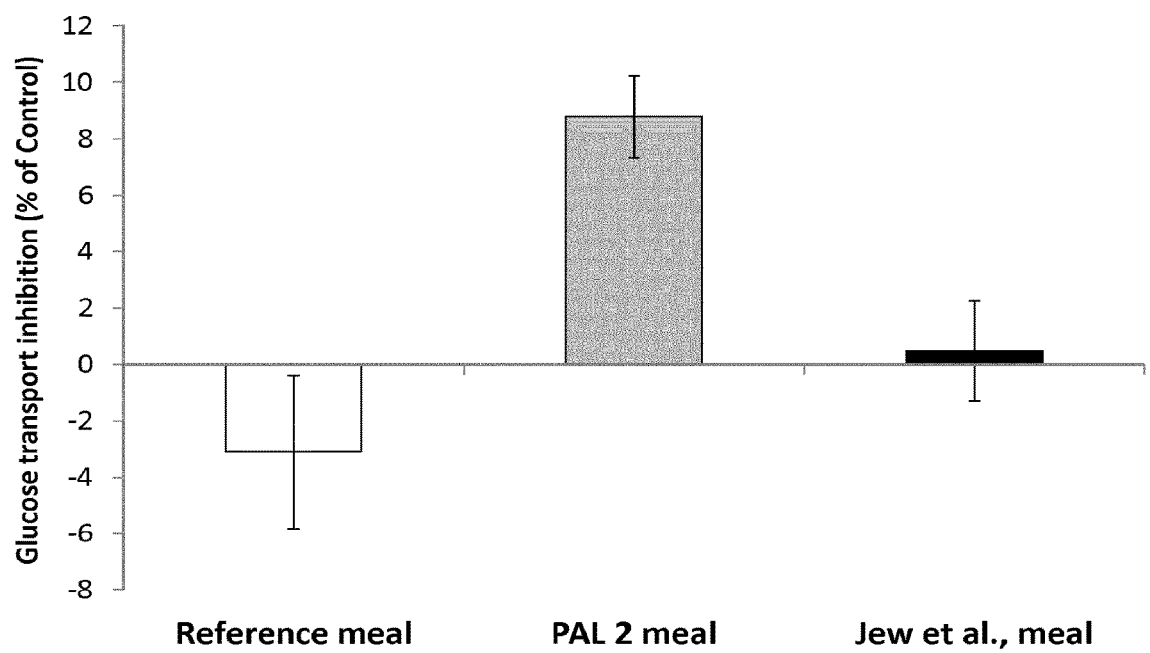
FIG. 11 inhibition of glucose transport by Reference, PAL 2 and Jew et al. dinner dichloromethane extracts (75 μg/ml) expressed as a percentage relative to a vehicle control.

FIG. 11 inhibition of glucose transport by Reference, PAL 2 and Jew et al. dinner dichloromethane extracts (75 µg/ml) expressed as a percentage relative to a vehicle control and Table 11 summarises the results for inhibition of glucose transport by Reference, PAL 2 and Jew et al. dinner aqueous methanol, petroleum ether, dichloromethane and 1-butanol extracts (all 75 µg/ml) expressed as a percentage relative to a vehicle control. The extracts were prepared as described previously.

TABLE 11

Inhibition of glucose transport by Reference, PAL 2 and Jew et al. dinner aqueous methanol, petroleum ether, dichloromethane and 1-butanol extracts (all 75 µg/ml) expressed as a percentage relative to a vehicle control.

| Extract | Meal | Glucose Transport Inhibition (% of control) |
|---|---|---|
| Aqueous methanol | Reference | −2.77% (±0.60%) |
|  | PAL2 | 4.77% (±3.63%) |
|  | Jew et al. | 2.04% (±4.07%) |
| Petroleum ether (40-60° C.) | Reference | 0.35% (±3.52%) |
|  | PAL2 | 0.05% (±3.26%) |
|  | Jew et al. | −4.25% (±5.55%) |
| Dichloromethane | Reference | −3.10% (±2.71%) |
|  | PAL2 | 8.79% (±1.45%) |
|  | Jew et al. | 0.48% (±1.78%) |
| 1-Butanol | Reference | −3.23% (±1.26%) |
|  | PAL2 | 0.39% (±2.46%) |
|  | Jew et al. | −0.99% (±0.87%) |

It can be seen that the dichloromethane extract from the PAL 2 meal demonstrated glucose transport inhibition (8.8%). In contrast, the dichloromethane extracts from neither Reference nor Jew et al. dinner had substantial glucose transport inhibitory activity (−3.0% and 0.5% respectively).

2 7 Conclusions

Extracts of PAL 2 meal and Jew et al. dinner display differential activation of GPCRs and gut glucose transporters. Ethyl acetate extracted fractions from PAL 2 and Jew et al. dinner exhibit comparable activity towards GPR14, whereas, although aqueous methanol, petroleum ether and dichloromethane meal extracts from the PAL 2 meal show agonist activity towards GPR14, these same fractions from Jew et al. show no positive receptor activation of GPR14. In contrast, water extracts of PAL 2 meal do not activate GPR14 whereas water extracts of Jew et al. exhibit agonist activity. In addition, all extracts from the PAL 2 meal, excluding the dichloromethane extracted fraction, show substantially greater agonist activity towards M1 and M3 Muscarinic receptors compared to the Jew et al. meal extracts. Furthermore, when assayed for gut glucose transporter inhibitory activity, the dichloromethane extracts from the PAL 2 meal demonstrate substantial inhibition whereas the dichloromethane extract from the Jew et al. meal have negligible inhibition towards the gut glucose transporters. Taken together these data demonstrate that differential physiological effects are observed between the PAL 2 meal and the Jew et al. meal. As these GPCR's are known to secrete gut hormones, including PYY, GLP-1 and GIP, without being bound by theory, the inventors believe that the increased quantity and different types of flavonoid in the inventive meals may be responsible for the difference in gut hormone release seen in FIGS. 4 to 6.

The invention claimed is:

1. A meal intended for human consumption providing 250-650 kilocalories and comprising: (a) 20-50 g of fibre; (b) 10-20 g of protein; (c) 0 to 5 g of starch; (d) 0 to 2 g of lactose; (e) 75-1000 mg of flavonoid aglycones and flavonoid glucosides, wherein any one of flavonoid aglycone is present in an amount of 20-250 mg and any one of flavonoid glucoside is present in an amount of 30-250 mg; and wherein said meal has an energy density of 0.21-1 kcal/g; and the term "meal" means a complete course of either breakfast, lunch or dinner, including dessert and excluding beverages.

2. A meal intended for human consumption, and when normalized to an energy content of 650 kilocalories, comprising: (a) 20-50 g of fibre; (b) 10-20 g of protein; (c) 0 to 5 g of starch; (d) 0 to 2 g of lactose; (e) 450-2000 mg of flavonoid aglycones and flavonoid glucosides when expressed in gallic acid equivalents; and wherein said meal has an energy density of 0.21-1 kcal/g; and the term "meal" means a complete course of either breakfast, lunch or dinner, including dessert and excluding beverages.

3. The meal according to claim 1, comprising at least 0.05 mg of at least one anthocyanidin as the flavonoid aglycone.

4. The meal according to claim 1, wherein the any one flavonoid aglycone and any one flavonoid glucoside is selected from the group consisting of apigenin, luteolin, myricetin, quercetin, cyanidin-3-glucoside, malvidin-3-glucoside, pelargonidin-3-glucoside and mixtures thereof.

5. The meal according to claim 2, comprising at least 0.05 mg of at least one anthocyanidin as the flavonoid aglycone.

6. The meal according to claim 2, wherein the any one flavonoid aglycone and any one flavonoid glucoside is selected from the group consisting of apigenin, luteolin, myricetin, quercetin, cyanidin-3-glucoside, malvidin-3-glucoside, pelargonidin-3-glucoside and mixtures thereof.

7. The meal according to claim 2, wherein the energy density is 0.25-1 kcal/g.

* * * * *